United States Patent
Sriram et al.

(10) Patent No.: US 11,359,135 B2
(45) Date of Patent: Jun. 14, 2022

(54) INVERSION AGENTS FOR WATER-IN-OIL LATTICES AND METHODS OF USE

(71) Applicant: Ecolab USA Inc., St. Paul, MN (US)

(72) Inventors: Suresh R. Sriram, Aurora, IL (US); Ramasubramanyam Nagarajan, Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 1 day.

(21) Appl. No.: 16/984,782

(22) Filed: Aug. 4, 2020

(65) Prior Publication Data

US 2021/0040377 A1    Feb. 11, 2021

Related U.S. Application Data

(60) Provisional application No. 62/883,759, filed on Aug. 7, 2019.

(51) Int. Cl.
| C09K 8/588 | (2006.01) |
| E21B 43/20 | (2006.01) |
| C09K 8/584 | (2006.01) |
| C08F 2/32  | (2006.01) |

(52) U.S. Cl.
CPC .............. C09K 8/588 (2013.01); C08F 2/32 (2013.01); C09K 8/584 (2013.01); E21B 43/20 (2013.01)

(58) Field of Classification Search
CPC .......... C09K 8/588; C09K 8/584; C09K 8/36; C08F 2/32; E21B 43/20
See application file for complete search history.

(56) References Cited

U.S. PATENT DOCUMENTS

| 3,624,019 | A | 11/1971 | Anderson et al. |
| 4,252,706 | A | 2/1981 | Phillips et al. |
| 4,687,807 | A | 8/1987 | Wetegrove et al. |
| 5,124,376 | A | 6/1992 | Clark, Jr. |
| 6,346,239 | B1 | 2/2002 | Mallo et al. |
| 2005/0261399 | A1 | 11/2005 | Hunkeler |
| 2012/0088698 | A1* | 4/2012 | Kayser .................. C09K 23/16 548/531 |
| 2016/0333252 | A1* | 11/2016 | Brinkman ............. C09K 8/584 |

FOREIGN PATENT DOCUMENTS

| CN | 103242471 A | 8/2013 |
| CN | 105418840 A | 3/2016 |

(Continued)

OTHER PUBLICATIONS

M. Renteria et al., Acrylamide inverse microemulsion polymerization in a paraffinic solvent: Rolling-M-245, Journal of Polymer Science Part A: Polymer Chemistry, 43(12), pp. 2495-2503, Jun. 2005.

(Continued)

*Primary Examiner* — Robert S Jones, Jr.
*Assistant Examiner* — Jiangtian Xu
(74) *Attorney, Agent, or Firm* — Kagan Binder, PLLC

(57) ABSTRACT

Water-in-oil lattices of water soluble polymers and methods of using the same are presented. The lattices are made, used, and stored having about 15 wt % to 70 wt % polymer solids and further include one or more alkyl ricinoleates. We have found that C1-C6 alkyl ricinoleates added to such lattices facilitate rapid and complete dilution to less than or equal to 1 wt % polymer solids in a continuous water phase. In particular under conditions wherein the water source used to invert the latex is provided at low temperature (−10° C. to 10° C.), or includes a high level of total dissolved solids, or is both low temperature and high total dissolved solids.

17 Claims, 5 Drawing Sheets

(56) References Cited

FOREIGN PATENT DOCUMENTS

| | | |
|---|---|---|
| CN | 106279522 A | 1/2017 |
| CN | 106749890 A | 5/2017 |
| DE | 2533108 A1 | 2/1977 |
| FR | 2277106 A1 | 1/1976 |

OTHER PUBLICATIONS

James N. Greenshields, Surfactants in inverse (water-in-oil) emulsion polymers of acrylamide, Surface Active Behaviour of Performance Surfactants. 2000; 3, pp. 66-96.

Thakur et al., Inverse emulsion polymerization of acrylamide, Journal of Polymer Materials, vol. 23, No. 1, pp. 39-46, Jan./Mar. 2006.

U.S. Dong et al., Retention and drainage characteristics with inverse emulsion type C-PAM, Palpu Chongi Gisul/Journal of Korea Technical Association of the Pulp and Paper Industry, vol. 38, No. 5, pp. 24-30, 2006.

Ignác Capek, On inverse miniemulsion polymerization of conventional water-soluble monomers, Advances in Colloid and Interface Science, vol. 156, No. 1-2, pp. 35-61, Apr. 2010.

C. He et al., Structure control and influencing factors of polyimide microspheres prepared by inverse emulsion technique, Polymeric Materials Science and Engineering, vol. 32, No. 7, pp. 12-16, Jul. 2016 (Official Copy with English Abstract).

\* cited by examiner

INVERSION AGENTS FOR WATER-IN-OIL LATTICES AND METHODS OF USE

TECHNICAL FIELD

The invention relates to water-in-oil lattices of water dispersible polymers and compositions that provide for rapid inversion of the lattices when diluted.

BACKGROUND

During primary recovery, the natural pressure of the reservoir or gravity drives oil into the wellbore, combined with artificial lift techniques (such as pumps) which bring the oil to the surface. But only about 10 percent of a reservoir's original oil in place is typically produced during primary recovery. Secondary recovery techniques extend a field's productive life generally by injecting water or gas to displace oil and drive it to a production wellbore, resulting in the recovery of 20 to 40 percent of the original oil in place.

Enhanced oil recovery, or EOR, is a generic term encompassing techniques for increasing the amount of crude oil that can be extracted from a subterranean formation such as an oil field. EOR techniques offer prospects for ultimately producing 30 to 60 percent, or more, of the reservoir's original oil in place. Three major categories of EOR have been found to be commercially successful to varying degrees:

Thermal recovery is the introduction of heat such as the injection of steam to lower the viscosity of the oil and improve its ability to flow through the reservoir.

Gas injection is the injection of gases such as natural gas, nitrogen, or carbon dioxide that expand in a reservoir to push additional oil to a production wellbore, or gases that dissolve in the oil to lower its viscosity and improve flow rate.

Chemical injection is the injection of polymer dispersions to increase the effectiveness of waterfloods, or the use of detergent-like surfactants to help lower the surface tension that often prevents oil droplets from moving through a reservoir. Chemical injection of a polymer is also referred to as polymer flooding. This method improves the vertical and areal sweep efficiency as a consequence of improving the water/oil mobility ratio. In addition, the polymer reduces the contrasts in permeability by preferentially plugging the high permeability zones flooded. This forces the water to flood the lower permeability zones and increases the sweep efficiency. The art in this area is well-developed for conventional oil recovery applications.

Of these techniques, polymer flooding using water-in-oil (w/o) latex products is particularly favored for use in offshore reservoirs and other relatively isolated operations due to the ease of use and relatively simple equipment requirements. Polymer flooding is generally accomplished by dissolving the selected polymer in water and injecting the polymer solution into the reservoir. However, since the target concentration of polymer in the polymer dispersions is typically about 1 wt % or less, transport at the target concentration is not economically efficient. Transporting the dried polymers, while economically efficient for the supplier, is not favorable for field use due to limited space for dry polymer make-down equipment and difficulties in fully hydrating the polymers in the field. To address these issues, various formulations have been developed to allow economically feasible transportation and storage. Specialized methods have also been developed to convert the formulations to use concentrations of fully hydrated polymers in the field.

Organic polymers traditionally used in EOR include water soluble polymers such as polyacrylamide homopolymers and copolymers with an anionic monomer such as acrylic acid or conjugate base thereof, a cationic monomer such as N,N-diallyl-N,N-dimethylammonium chloride (DADMAC), and/or one or more other water soluble monomers, and hydrophobically modified water soluble polymers, also called associative polymers or associative thickeners. Associative thickeners are typically copolymers of acrylamide, acrylic acid, or both with about 1 mole % or less of a hydrophobic monomer such as a C8-C16 linear or branched ester of acrylic acid. Any of these water soluble polymers are deliverable as a dry powder, as a gel-like concentrate in water, or dispersed within the water phase of a water-in-oil (w/o) latex. Of these, w/o lattices have the advantage of being deliverable in a fluid format that is easily handled in the field because the latex viscosity is lower than that of a water solution of comparable polymer content. The fluid latex products are also easy to "make down", or "invert"—that is, dilute with water to form an injectable polymer solution or dispersion—with little equipment and a small space footprint compared to that of dry polymer products.

Commercial w/o lattices are formulated for EOR by dissolving monomer(s) in a high-solids aqueous solution to form a water phase (or monomer phase), mixing one or more hydrocarbon solvents and a surfactant or a blend thereof having a hydrophilic-lipophilic balance (HLB) of about 2 to 10 to form an oil phase, mixing the two phases using techniques to result in a water-in-oil emulsion or latex, and polymerizing the monomer via a standard free-radical initiation. The w/o latex may be a macroemulsion, nanoemulsion, microemulsion, or combination thereof. The free radical initiation may be radiation, photo, thermal, or redox initiation, or any combination thereof. After polymerization is complete, a higher HLB surfactant (HLB>10) or a blend thereof having an HLB>10 is often added to facilitate latex inversion when water is added. "inversion" is a term of art to describe the dilution of w/o lattices with a water source, causing destabilization of the latex and subsequent dissolution of the concentrated polymer particles into a continuous aqueous phase. In some cases, the higher HLB surfactant is added in the field, immediately prior to addition of water to dilute the latex; or is added in-line with the water source used to dilute the latex. In other cases, the higher HLB surfactant is added directly to the w/o latex after polymerization is complete, and the latex is stable or even shelf stable. In such cases, careful control of type and amount of surfactant is required to provide a sufficiently stable latex to facilitate storage and transportation, while providing for improved inversion performance in the field.

Recently, there has arisen the need to address polymer flooding in challenging conditions encountered in reservoirs wherein the ambient or produced water contacted by the polymer includes high total dissolved solids, such as a high saline or hardness content, in some cases involving total dissolved solids of up to about 30 wt %. In some cases the ambient or produced water is tap water, hard water, brackish water, municipal waste water, produced water, or seawater. Field operators strongly prefer to use such water sources to dilute polymer flooding formulations to final use concentrations rather than employ purified water sources. Cost is reduced by diverting some or all of the water source already being injected into a reservoir to dilute the polymer flooding formulations; and both environmental impact and cost are reduced by reducing or eliminating the need to use purified water. However, use of such water sources leads to difficulties in dispersing the high molecular weight polymers to use concentrations. Inversion of w/o lattices in such water sources can result in slow inversion times and/or the requirement of multistage dilution and mixing procedures; it can also result in coagulation, precipitation, or gross phase separation of polymer upon or after contact of the latex with the diluted water environment. Thus there is a need to address inversion of w/o lattices in field conditions where the use water source has high total dissolved solids.

Another need in the industry is to address reservoirs where the water source contacted by a w/o latex during inversion to form a polymer flooding solution is at a low temperature, such as −10° C. to 10° C., or where the latex is present at such temperature range (for example, stored outside in cold weather), or both the latex and the water source are present at such temperature range when combined. Low temperature water sources lead to practical difficulties in dispersing high molecular weight, water soluble polymers delivered from w/o lattices. Low temperature conditions tend to cause instability of w/o lattices during inversion, evidenced by formation of gel particles, coagulum, polymer coated out on contact surfaces, and gross coalescence of phases (conventionally referred to as "separation") and the like. The products of this instability cause plugged equipment in the field, reduced reservoir permeability, plugged formation, and ultimately failure to accomplish mobility control within the reservoir. These problems remain largely unaddressed by conventional formulations, methods, and equipment developed for inversion of w/o lattices in the field.

As a result, there remains a substantial need in the industry for w/o polymer lattices that invert rapidly to form stable, fully hydrated or dissolved polymer solutions. There is a substantial need in the industry for w/o polymer lattices that invert rapidly to form stable, fully hydrated or dissolved polymer solutions at low latex temperatures, low water temperatures, or low latex and water temperatures. There is a substantial need in the industry for w/o polymer lattices that invert rapidly to form stable, fully hydrated or dissolved polymer solutions at polymer concentrations of 1 wt % or less.

SUMMARY

Described herein are invertible water-in-oil (w/o) lattices. An invertible latex is formed by combining a w/o latex with a C1-C6 alkyl ricinoleate. The w/o latex comprises a water soluble or water dispersible polymer. In embodiments, the w/o latex comprises 5 wt % to 70 wt % of the water soluble or dispersible polymer, wherein the water soluble polymer comprises 1 mol % to 100 mol % acrylamide residue. In embodiments, the invertible latex further comprises one or more inversion surfactants, wherein the inversion surfactant or the total mixture thereof comprises a hydrophilic/lipophilic balance of 10 or greater. The inversion surfactant does not lead to instability of the w/o latex. Recitation of the singular "inversion surfactant" also refers to a blend of two or more surfactants, wherein the blend is the inversion surfactant. In embodiments, an inversion surfactant is added to the w/o latex in an amount corresponding to 0.1 wt % to 10.0 wt % based on the weight of the latex. In embodiments, the alkyl ricinoleate is added to the w/o latex in an amount corresponding to 0.1 wt % to 20.0 wt % based on the weight of the latex. The inversion surfactant and the ricinoleate ester are added to the w/o latex sequentially in any order, or contemporaneously. The inversion surfactant and the ricinoleate ester are added batchwise or continuously to the w/o latex. After addition of the inversion agent to the w/o latex to form the invertible latex, the invertible latex is inverted. The invertible latex is optionally stored between forming and inverting, wherein the period of storage is between 1 day and 5 years and within the temperature range of about −10° C. to 60° C.

In embodiments, inverting comprises applying a water source to the invertible latex in an amount sufficient to form a polymer solution, the polymer solution comprising about 90 wt % to 99.99 wt % of the water source and about 1 wt % to 0.01 wt % (10,000 ppm to 100 ppm by weight) of the water soluble or water dispersible polymer. In embodiments, after inverting, the inverted mixture is injected into a subterranean reservoir, and hydrocarbon is recovered therefrom. Solution formation, that is, hydration of the water soluble polymer, is both rapid and complete when the invertible lattices comprising alkyl ricinoleate are inverted and injected. The rapid and complete conversion is even more remarkable when carried out under conditions where cold temperatures, for example −10° C. to 10° C., are encountered in the field.

In embodiments, an invertible latex comprises a w/o latex combined with about 0.1 wt % to 20.0 wt % of a C1-C6 alkyl ricinoleate based on the weight of the w/o latex. In embodiments the invertible latex further comprises about 0.1 wt % to 10.0 wt % of an inversion surfactant based on the weight of the w/o latex. In some embodiments, the w/o latex comprises about 15 wt % to 70 wt % of a water soluble polymer; about 3 wt % to 80 wt % water; about 10 wt % to 40 wt % of an oil, which is characterized as a compound or blend thereof that is less than 0.1 wt/o soluble in water at 25° C. and is substantially a liquid over the range of 20° C. to 90° C. and comprising linear, branched, or cyclic hydrocarbon moieties; and about 20 wt % or less of a latex surfactant characterized as having a hydrophilic/lipophilic balance of between 2 and 10.

Also described herein is a method of forming an invertible latex, the method comprising a) forming a water-in-oil latex comprising about 15 wt % to 70 wt % of a water soluble or dispersible polymer, about 3 wt % to 50 wt % water; about 10 wt % to 40 wt % of a compound or blend thereof that is less than 0.1 wt % soluble in water at 25° C. and is substantially a liquid over the range of 20° C. to 90° C. and comprising linear, branched, or cyclic hydrocarbon moieties; about 20 wt % or less of a latex surfactant characterized as having a hydrophilic/lipophilic balance of between 2 and 10; and about 0.1 wt % to 10.0 wt % of an inversion surfactant characterized as having a hydrophilic/lipophilic balance of 10 or greater; and b) adding to the w/o latex about 0.1 wt % to 20.0 wt % of an alkyl ricinoleate, based on the weight of the w/o latex, to form an invertible latex.

Also described herein is a method of recovering hydrocarbon compounds from a subterranean reservoir, the method comprising a) forming an invertible latex comprising about 15 wt % to 70 wt % of a water soluble or dispersible polymer, about 3 wt % to 50 wt % water, about 10 wt % to 40 wt % of a compound or blend thereof that is less than 0.1 wt % soluble in water at 25° C. and is substantially a liquid over the range of 20° C. to 90° C. and comprising linear, branched, or cyclic hydrocarbon moieties, and about 20 wt % or less of a latex surfactant characterized as having a hydrophilic/lipophilic balance of between 2 and 10; and adding to the latex about 0.1 wt % to 10.0 wt % of an inversion surfactant characterized as having a hydrophilic/lipophilic balance of 10 or greater and about 0.1 wt % to 20.0 wt % of a C1-C6 alkyl ricinoleate; b) adding a water source to the invertible latex in a single addition to form a polymer solution comprising about 100 ppm to 10,000 ppm of the water soluble or dispersible polymer; c) injecting the polymer solution into the subterranean reservoir; and d) recovering the hydrocarbon compounds.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Figure 1:
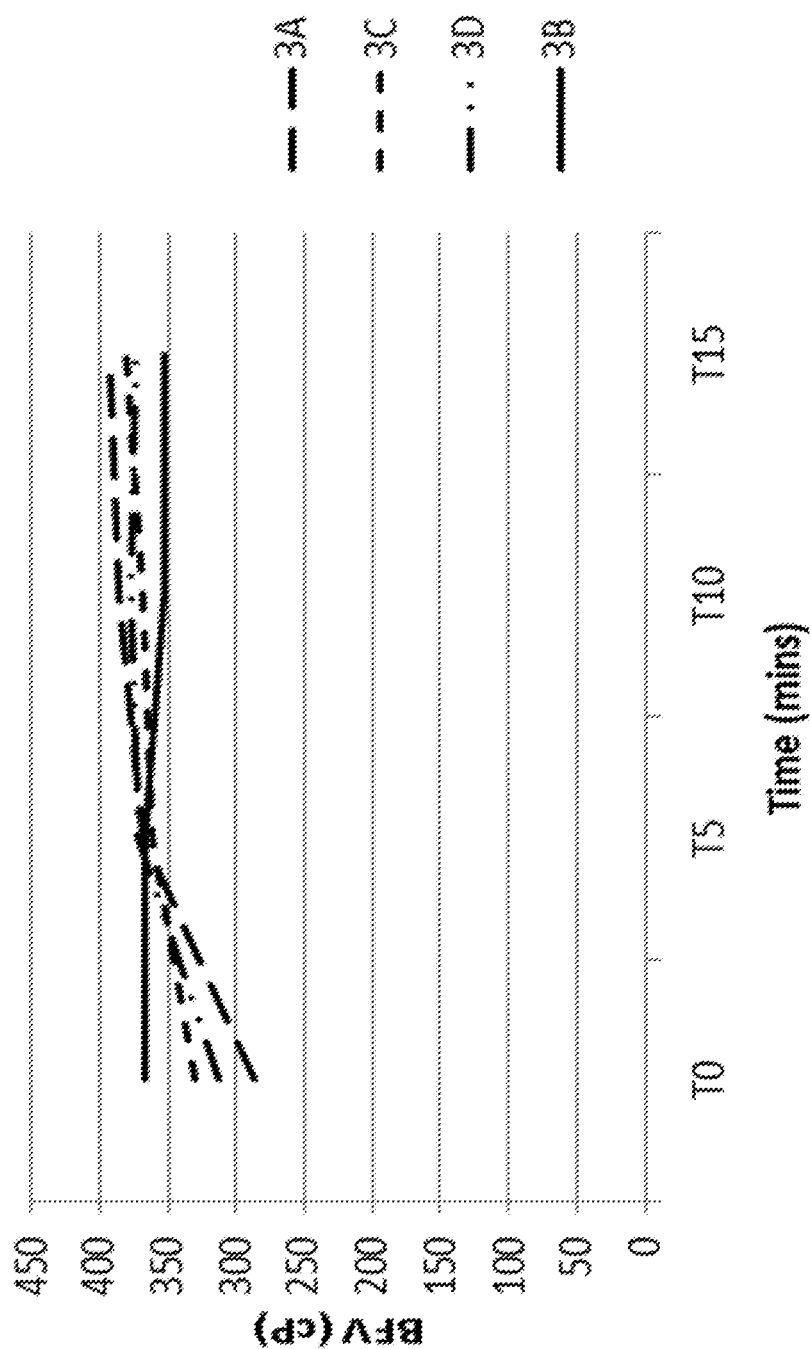
FIG. 1 shows a plot of Brookfield viscosity (cP) as a function of time, showing the inversion behavior of w/o lattices of the invention when inverted according to Procedure B.

Although the present disclosure provides references to preferred embodiments, persons skilled in the art will recognize that changes may be made in form and detail without departing from the spirit and scope of the invention. Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

Definitions

As used herein, the term "water soluble polymer" or in context "polymer" means a water soluble or water dispersible polymer having at least 5 repeating units attributable to monomer residues. The term "polymer" encompasses homopolymers, copolymers, terpolymers and polymers comprising the residue of more than 3 different monomers, as specified or determined by context. "Polymer" also includes a crosslinked polymer network.

The term "monomer" is used in context to mean an ethylenically unsaturated polymerizable compound or the polymerized residue thereof. As used herein, the term "anionic monomer" means an unsaturated compound or polymerized residue thereof, as determined by context, bearing one or more acidic groups, or a salt (conjugate base) thereof bearing one or more negative charges. As used herein, the term "cationic monomer" means an unsaturated compound or polymerized residue thereof bearing a positive charge. A polymer may be referred to as including one or more monomers; in such contexts the reference is to the polymerized residues of the one or more monomers.

As used herein, the term "polymer solution", "polymer dispersion", and like terms such as "aqueous polymer solution", "aqueous polymer dispersion", "polymer flooding solution" and the like refers to a mixture of about 100 ppm to 10,000 ppm by weight of a water soluble polymer that is dispersed or dissolved in a water source.

As used herein, the term "water source" means a source of water comprising, consisting essentially of, or consisting of water. Water sources include fresh water, deionized water, distilled water, tap water, produced water, municipal water, waste water such as runoff water or municipal waste water, treated or partially treated waste water, well water, brackish water, "gray water", sea water, or a combination of two or more such water sources as determined by context. In some embodiments, a water source includes one or more salts, ions, buffers, acids, bases, surfactants, or other dissolved, dispersed, or emulsified compounds, materials, components, or combinations thereof.

As used herein, the term "low temperature" and like terms refers to a temperature between about −10° C. and 10° C., as specified or determined by context.

As used herein, the terms "water-in-oil latex" or "w/o latex" mean a discontinuous internal water phase within a continuous oil phase, wherein the water phase comprises a polymer solution. As used herein, the term "latex" generally refers to an emulsion comprising a polymer dispersed within the discontinuous phase thereof. However, in contexts where latex formation or polymer synthesis is discussed, "latex" may also refer to nascent latex, that is, a w/o emulsion before or during polymerization wherein the discontinuous water phase comprises one or more monomeric species.

As used herein, the term "oil" or "hydrocarbon solvent" as applied to an oil phase of a water-in-oil latex, means any compound or blend thereof that is less than 0.1 wt % soluble in water at 25° C. and is substantially a liquid over the range of 20° C. to 90° C. and consists essentially of linear, branched, or cyclic hydrocarbon moieties.

As used to describe compositions herein, the term "stable" means a kinetically stable fluid composition that absent any force applied, temperature change, or chemical added remains substantially free of coagulation, plating out, precipitation, gross coalescence of phases (conventionally referred to as "separation") or any other evidence of instability conventionally associated with water-in-oil lattices for at least about 24 hours under the specific conditions stated; or otherwise at 20° C. if not specified.

As used herein, the term "invertible latex" means a w/o latex additionally including at least one C1-C6 alkyl ricinoleate. In embodiments the invertible latex further includes one or more inversion surfactants.

As used herein, the term "invert" or "inversion" as applied to the w/o lattices of the invention means to contact an invertible latex with a water source in an amount sufficient to form a polymer solution, the polymer solution having between about 100 ppm and 10,000 ppm by weight of polymer.

As used herein, the term "single component" as applied to the w/o lattices of the invention means that at least one inversion surfactant and at least one inversion agent are added to an existing w/o latex and the combination is stable. The term is used in contrast to inversion surfactants or other compounds added in-line during injection and inversion.

As used herein, the term "optional" or "optionally" means that the subsequently described component, event or circumstance may be, but need not be present or occur. The description therefore discloses and includes instances in which the event or circumstance occurs and instances in which it does not, or instances in which the described component is present and instances in which it is not.

As used herein, the term "about" modifying, for example, the quantity of an ingredient in a composition, concentration, volume, temperature, time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, through standard operating machine error, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents according to this definition.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

Water-in-Oil (w/o) Lattices

We have discovered inversion agents comprising, consisting essentially of, or consisting of C1-C6 esters of 12-hydroxy-9-cis-octadecenoic acid, or ricinoleic acid, provide rapid and complete inversion of water-in-oil (w/o) lattices having up to about 70 wt % water soluble polymer content, to yield polymer solutions having about 10,000 ppm by weight (1.00 wt %) to 100 ppm by weight (0.01 wt %) polymer. In embodiments, one or more inversion agents are added to a w/o latex, along with one or more inversion surfactants, to form an invertible latex. The ricinoleate esters are sourced from synthetic or natural sources, as selected by the user. Castor oil is the principal natural source of ricinoleic acid, which is useful for making the C1-C6 alkyl esters thereof using conventional reaction processes well understood by those of skill.

The invertible lattices are easily and rapidly inverted by adding a water source to the invertible latex to form a polymer solution having about 100 ppm to 10,000 ppm by weight of the water soluble polymer. In embodiments the water source is a low temperature water source, wherein the water source temperature is between about −10° C. and 10° C. before and/or during the addition thereof to the latex. In some embodiments, the temperature of the invertible latex is between −10° C. and 10° C. before and/or during the addition of the water source to the latex. In some embodiments the water source includes about 0.1 wt % to 30 wt % dissolved solids; in some such embodiments the water source further comprises a temperature of −10° C. and 10° C.

The inversion agents comprising ricinoleate esters are known by those of skill to function as "chain stoppers" during homolytic propagation, leading to severely limited molecular weight during free radical addition polymerization processes. The water soluble polymers known to those of skill to be highly efficient at increasing viscosity of a water source—and consequently the most important water soluble polymers commercially produced for such applications—are commercially formed by free radical addition polymerization. Higher molecular weight leads to maximum efficiency of these polymers in raising the ultimate viscosity of water sources in which they are dispersed or dissolved. For this reason, the inversion agents are excluded or substantially excluded during polymerization of the water soluble polymer. Instead, a w/o latex comprising a high molecular weight water soluble polymer is formed, and then the inversion agent is added after polymerization is completed.

Further, we previously reported in U.S. patent application Ser. No. 15/228,446 (published as U.S. Patent Application Publication No. 2017/0037298) that hydroxycarboxylic acids that are also hydrotropes are inversion agents, wherein the hydrotropes are compounds having an uninterrupted hydrocarbyl moieties of 5 carbons or less and are water soluble. We now report that esters of ricinoleic acid:

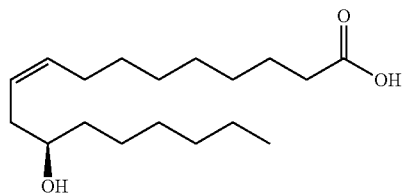

Ricinoleic acid which are not surfactants and are not hydrotropes, surprisingly provide superior performance as inversion agents. In particular, C1-C6 ricinoleates provide superior inversion performance at low temperatures, facilitating methods of inversion wherein the invertible latex, the water source employed for inversion, or both are present at temperatures as low as −10° C.

Comparison of C1-C6 ricinoleate esters to C1-C6 esters of other natural fatty acid esters such as fatty acid methyl esters of soybean oil (FAME-S) and fatty acid methyl ester of canola oil (FAME-C) further reveals that the ricinoleate esters provide superior performance as inversion agents for w/o lattices when compared on a weight basis. Superior performance is manifested by faster rate of inversion to form a stable polymer solution. In particular, the superior performance of ricinoleate esters as inversion agents is manifested in inversion processes carried out at temperatures between −10° C. and 10° C. as will be discussed in more detail herein.

Thus, an inversion agent comprising, consisting essentially of, or consisting of one or more C1-C6 alkyl ricinoleates is added to a w/o latex to form an invertible latex. In embodiments, about 0.1 wt % to 20 wt %, for example about 1 wt % to 10 wt % of the inversion agent is added to a w/o latex based on the weight of the invertible latex. In embodiments, the invertible latex further includes an inversion surfactant. In embodiments, an invertible latex comprises, consists essentially of, or consists of a w/o latex, one or more inversion surfactants, and an inversion agent. The inversion surfactant combined with the inversion agent facilitate latex inversion and yield a stable polymer solution having a concentration of about 1.00 wt % (10,000 ppm by weight) or less. The polymer solution comprising 100 ppm to 10,000 ppm water soluble polymer by weight has a measurably higher viscosity than the water source without the water soluble polymer present.

The inversion agents, combined with one or more inversion surfactants, provide a faster rate of viscosity increase during/after inversion (that is, dilution with a water source) than the same inversion conducted without the inversion agent. The inversion agents also provide a more rapid increase in viscosity of the polymer solution when inversion is carried out at low temperatures, than the same inversion conducted without addition of the inversion agent. The invertible lattices are stable when stored and inverted at temperatures between about −10° C. The invertible lattices are lower in viscosity than the same lattices without the inversion agents, which leads to ease of use in the field, particularly at low temperatures.

In embodiments, the w/o lattices useful to form the invertible lattices described herein are formulated by dissolving one or more monomers in an aqueous solution to form an aqueous phase; mixing one or more hydrocarbon solvents and a surfactant or a blend thereof having a hydrophilic-lipophilic balance (HLB) of about 2 to 10 to form an oil phase; mixing the two phases using known techniques to result in a water-in-oil emulsion; and polymerizing the monomer(s) via conventional free-radical addition polymerization to form a w/o latex. The w/o latex may be a macroemulsion, microemulsion, nanoemulsion; in embodiments the latex has a higher order of structure than simple w/o dispersion of particles, as will be familiar to those of skill. In any of these embodiments, the w/o latex is characterized as being fluid, that is, pumpable or pourable within at least a portion of the temperature range of 0° C. to 100° C.

Water soluble polymers useful in the w/o lattices include conventional EOR polymers as well as variations, mixtures, or derivatives thereof. The invention is not particularly limited as to the polymer employed in the water phase of the w/o lattices, however, in embodiments the water soluble polymer is sufficiently water soluble or dispersible to result in a measurable increase of viscosity when dissolved/dispersed in water at 1 wt % and at 20° C. Exemplary but non-limiting water soluble polymers include polyacrylamides, polyacrylates, and copolymers of these, including hydrophobically modified derivatives thereof (associative thickeners). Associative thickeners typically include about 1 wt % or less, based on total weight of dry polymer, of a monomer having a long-chain hydrocarbon functionality intended to produce physical or associative crosslinking when hydrated in a water source. Such hydrophobically associating polymers are well known in the industry for EOR applications. In some embodiments, the hydrocarbyl functionality includes 8 to 20 carbons, or 10 to 20 carbons, or 12 to 20 carbons arranged in a linear, branched, or cyclic conformation. In some embodiments, the hydrophobically associating monomers are present in the water soluble polymer at about 1 wt % or less of the total weight of the polymer, for example about 0.01 wt % to 1.00 wt %, or about 0.1 wt % to 1.00 wt %, or about 0.20 wt % to 1.00 wt % of the total weight of the water soluble polymer.

In embodiments, the water soluble polymer comprises polymerized residues of about 1 mol % to about 100 mol % acrylamide monomers, or about 1 mol % to about 90 mol %, or about 1 mol % to about 80 mol %, or about 1 mol % to about 70 mol %, or about 1 mol % to about 60 mol %, or about 1 mol % to about 50 mol %, or about 1 mol % to about 40 mol %, or about 1 mol % to about 30 mol %, or about 1 mol % to about 20 mol %, or about 1 mol % to about 10 mol %, or about 10 mol % to about 100 mol %, or about 20 mol % to about 100 mol %, or about 30 mol % to about 100 mol %, or about 40 mol % to about 100 mol %, or about 50 mol % to about 100 mol %, or about 60 mol % to about 100 mol %, or about 70 mol % to about 100 mol %, or about 80 mol % to about 100 mol %, or about 90 mol % to about 100 mol %, or about 20 mol % to about 80 mol %, or about 30 mol % to about 70 mol %, or about 40 mol % to about 60 mol %, or about 60 mol % to about 80 mol % acrylamide monomers.

Other monomers usefully incorporated into the water soluble polymer along with acrylamide and/or acrylic acid include cationic monomers, anionic monomers, and nonionic monomers. Nonlimiting examples of cationic monomers include N,N-diallyl-N,N-dimethylammonium chloride (DADMAC), N-alkyl ammonium salts of 2-methyl-1-vinyl imidazole, N-alkyl ammonium salts of 2-vinyl pyridine or 4-vinyl pyridine, N-vinyl pyridine, and trialkylammonium alkyl esters and amides derived from acrylic acid or acrylamide, respectively, including for example 2-(acryloyloxy)-N,N,N-trimethylethanammonium chloride. Nonlimiting examples of anionic monomers include methacrylic acid, 2-acrylamido-2-methylpropane sulfonic acid (AMS), vinylphosphonic acid, and vinyl sulfonic acid and conjugate bases or neutralized forms thereof (salts). Nonlimiting examples of nonionic monomers include methacrylamide and alkyl ester or amide derivatives of acrylic acid or acrylamide, such as N-methyl acrylamide or butyl acrylate. In some embodiments, the water soluble polymer consists essentially of or consists of acrylamide residues. In some embodiments, the water soluble polymer consists essentially of or consists of residues of acrylamide and acrylic acid and/or a conjugate base thereof. In some embodiments, the water soluble polymer consists essentially of or consists of residues of acrylamide and 2-(acryloyloxy)-N,N,N-trimethylethanammonium chloride.

Also present in the w/o latex is an amount of water sufficient to form a water phase within the latex. Water is present in the w/o latex at about 3 wt % to 50 wt % based on the total weight of the latex, or about 5 wt % to 50 wt %, or about 10 wt % to 50 wt %, or about 15 wt % to 50 wt %, or about 20 wt % to 50 wt %, or about 25 wt % to 50 wt %, or about 3 wt % to 45 wt %, or about 3 wt % to 40 wt %, or about 3 wt % to 35 wt %, or about 3 wt % to 30 wt %, or about 3 wt % to 25 wt %, or about 5 wt % to 45 wt %, or about 5 wt % to 40 wt %, or about 5 wt % to 35 wt %, or about 5 wt % to 30 wt %, or about 5 wt % to 25 wt % based on the total weight of the w/o latex. In some embodiments, the water is a water source.

Also present in the w/o latex is an amount of oil sufficient to form a continuous oil phase within the w/o latex. In some embodiments, the oil is not flammable at temperatures less than about 90° C., or less than about 80° C., or less than about 70° C. In some embodiments, the oil is a mixture of compounds, wherein the mixture is less than 0.1 wt % soluble in water at 25° C. and is substantially a liquid over the range of 20° C. to 90° C., In some embodiments, the oil comprises, consists essentially of, or consists of one or more linear, branched, or cyclic hydrocarbon moieties, aryl or alkaryl moieties, or combinations of two or more such moieties. In some embodiments, the oil has a density of about 0.8 g/L to 1.0 g/L, for example about 0.8 g/L to 0.9 g/L. Examples of suitable oils include decane, dodecane, isotridecane, cyclohexane, toluene, xylene, and mixed paraffin solvents such as those sold under the trade name ISOPAR® by ExxonMobil Corp. of Irving, Tex. In embodiments, the oil is present in the w/o latex at about 10 wt % to 40 wt % based on the total weight of the w/o latex, or about 15 wt % to 40 wt %, or about 20 wt % to 40 wt %, or about 22 wt % to 40 wt %, or about 24 wt % to 40 wt %, or about 26 wt % to 40 wt %, or about 28 wt % to 40 wt %, or about 30 wt % to 40 wt %, or about 10 wt % to 38 wt %, or about 10 wt % to 36 wt %, or about 10 wt % to 34 wt %, or about 10 wt % to 32 wt %, or about 10 wt % to 30 wt %, or about 10 wt % to 25 wt %, or about 10 wt % to 20 wt %, or about 15 wt % to 35 wt %, or about 20 wt % to 30 wt % based on the total weight of the w/o latex.

Also present in the w/o latex is one or more latex surfactants. Latex surfactants are conventionally employed to form and stabilize the w/o emulsions during polymerization and to maintain latex stability until inversion. Generally the latex surfactant is present at about 20 wt % or less based on the weight of the latex. Conventionally employed latex surfactants for w/o lattices include but are not limited to nonionic ethoxylated fatty acid esters, ethoxylated sorbitan fatty acid esters, sorbitan esters of fatty acids such as sorbitan monolaurate, sorbitan monostearate, and sorbitan monooleate, block copolymers of ethylene oxide and hydroxyacids having a C10-C30 linear or branched hydrocarbon chain, and blends of two or more of these. In embodiments, a mixture of two or more latex surfactants are selected, and/or are selected in a particular ratio, to achieve a selected hydrophilic/lipophilic balance (HLB). Those of skill will understand that a plethora of surfactants are employed throughout the industry to form and stabilize w/o lattices, serving as emulsifiers for polymerization of monomers and further maintaining emulsion stability of the polymer formed therein until subsequent use in the field. Any nonionic surfactants and blends thereof conventionally employed in w/o lattices for EOR applications are suitably employed in conjunction with the presently described invertible lattices. In embodiments, the latex surfactant is a single nonionic surfactant or blend thereof having a combined HLB value of about 2 to 10, for example about 3 to 10, or about 4 to 10, or about 5 to 10, or about 6 to 10, or about 7 to 10, or about 8 to 10, or about 2 to 9, or about 2 to 8, or about 2 to 7, or about 2 to 6, or about 2 to 5, or about 3 to 9, or about 4 to 8.

Representative amounts of the above listed materials are suitably included in one or more w/o lattices useful to stabilize one or more EOR applications, wherein the amounts are suitably selected to provide optimal kinetic stability of the resulting latex. Representative ratios of these materials are shown below in Table 1, wherein these amounts are intended to be representative of the w/o lattices useful in conjunction with the methods and materials of the invention. Useful w/o lattices are not limited to those shown in Table 1. Where amounts listed in Table 1 do not add up to 100 wt %, one or more unlisted additional components are also present in the w/o latex.

TABLE 1

Representative conventional w/o latex component ratios.

| | | Conventional w/o Latex, wt % | | | | |
|---|---|---|---|---|---|---|
| Phase | Material | Latex 1 | Latex 2 | Latex 3 | Latex 4 | Latex 5 |
| Oil | Oil | 25 | 30 | 10 | 20 | 25 |
| | Latex Surfactant | 15 | 5 | 3 | 5 | 20 |
| Aqueous | Polymer | 50 | 25 | 50 | 35 | 40 |
| | Water | 5 | 40 | 10 | 3 | 10 |

The w/o lattices optionally include one or more additives. Salts, buffers, acids, bases, dyes, thermal stabilizers, metal chelators, coalescing solvents, and the like are optionally included in the w/o lattices. In some embodiments, the additives include one or more corrosion inhibitors, scale inhibitors, emulsifiers, water clarifiers, hydrogen sulfide scavengers, gas hydrate inhibitors, biocides, pH modifiers, antioxidants, asphaltene inhibitors, or paraffin inhibitors. While the amount of an additive usefully employed depends on the additive and the intended application, in general the amount of any individual additive is about 0 wt % to 5 wt % based on the total weight of the w/o latex, or about 0 wt % to 4 wt %, or about 0 wt % to 3 wt %, or about 0 wt % to 2 wt %, or about 0 wt % to 1 wt % based on the total weight of the emulsion or latex.

In embodiments, the w/o lattices are made using conventional equipment and methodology. Thus, in embodiments a w/o emulsion containing the monomers is formed, and the polymerization is conducted within the water phase of the emulsion, to result in a w/o latex. In other embodiments the water soluble polymer is formed in a water solution, and the solution is used to form a w/o latex. In such embodiments, the w/o latex is formed after polymerization is complete by adding one or more surfactants and one or more oils to the water-based polymer composition and emulsifying the combined components as described above.

Water soluble polymer employed for EOR are desirably high molecular weight, as conventionally employed in EOR applications. Higher molecular weight increases the efficacy of the water soluble polymer in viscosifying water. However, higher molecular weight also increases difficulty in dissolution due to the high level of chain entanglement between polymer strands as well as strong hydrogen bonding between polymer functionalities such as amides and carboxylates. In embodiments, the water soluble polymers usefully incorporated in the w/o lattices have a weight average molecular weight ($M_w$) of about $3\times10^5$ to about $1\times10^8$ g/mol, or about $1\times10^6$ g/mol to about $3\times10^7$ g/mol, for example $2\times10^6$ g/mol to $3\times10^7$ g/mol, or $3\times10^6$ g/mol to $3\times10^7$ g/mol, or $4\times10^6$ g/mol to $3\times10^7$ g/mol, or $5\times10^6$ g/mol to $3\times10^7$ g/mol, or $6\times10^6$ g/mol to $3\times10^7$ g/mol, or $7\times10^6$ g/mol to $3\times10^7$ g/mol, or $8\times10^6$ g/mol to $3\times10^7$ g/mol, or $9\times10^6$ g/mol to $3\times10^7$ g/mol, or $1\times10^6$ g/mol to $3\times10^7$ g/mol, or $1\times10^6$ g/mol to $1.5\times10^7$ g/mol, or $1\times10^6$ g/mol to $1\times10^7$ g/mol, or $5\times10^6$ g/mol to $1\times10^7$ g/mol. In embodiments the weight average molecular weight is determined by capillary viscometry (Reduced Specific Viscosity and Intrinsic Viscosity), or multi-angle light scattering (MALS), generally in accordance with the techniques described in J. Appl. Polym. Sci. 2016, 133, 43748.

In embodiments, the w/o latex further includes a crosslinking monomer or polymer. The crosslinker may be labile, non-labile, or a combination thereof. One non-limiting example of a labile crosslinker is a glyoxal cross-linking monomer as described in U.S. Patent Application Publication No. 2014/0209304, which is incorporated by reference herein in its entirety. One non-limiting example of a non-labile crosslinker is methylene bis(acrylamide), as described in U.S. Pat. No. 7,300,973, which is incorporated by reference herein in its entirety.

In embodiments, the w/o latex comprises about 0.1 ppm to about 20000 ppm labile or non-labile cross-linked monomer units based on the weight of the water soluble polymer, or about 0.1 ppm to about 10000 ppm, or about 0.1 ppm to about 5000 ppm, or about 0.1 ppm to about 1000 ppm, or about 0.1 ppm to about 100 ppm, or about 1 ppm to about 20000 ppm, or about 10 ppm to about 20000 ppm, or about 100 ppm to about 20000 ppm, or about 1000 ppm to about 20000 ppm, or about 5000 ppm to about 20000 ppm, or about 10000 ppm to about 20000 ppm, or about 100 ppm to about 10000 ppm, or about 1000 ppm to about 5000 ppm cross-linked monomer units based on the weight of the polymer. In embodiments, the polymer including the cross-linking monomer comprises about 100 ppm to about 10000 ppm of a w/o latex, or about 100 ppm to about 5000 ppm, or about 100 ppm to about 1000 ppm, or about 100 ppm to about 500 ppm, or about 500 ppm to about 10000 ppm, or about 1000 ppm to about 10000 ppm, or about 5000 ppm to about 10000 ppm, or about 500 ppm to about 5000 ppm, or about 100 ppm to about 1000 ppm, of a w/o latex.

In embodiments, one or more water soluble polymers are present substantially within the water phase in a w/o latex. In embodiments, the water soluble polymers are present within the w/o lattices at about 15 wt % to 70 wt % based on the total weight of the latex, or about 20 wt % to 70 wt %, or about 25 wt % to 70 wt %, or about 30 wt % to 70 wt %, or about 35 wt % to 70 wt %, or about 40 wt % to 70 wt %, or about 15 wt % to 65 wt %, or about 15 wt % to 60 wt %, or about 15 wt % to 55 wt %, or about 15 wt % to 50 wt %, or about 15 wt % to 45 wt %, or about 15 wt % to 40 wt %, or about 20 wt % to 65 wt %, or about 20 wt % to 60 wt %, or about 20 wt % to 55 wt %, or about 20 wt % to 50 wt %, or about 30 wt/o to 65 wt %, or about 30 wt % to 60 wt %, or about 30 wt % to 55 wt %, or about 30 wt % to 50 wt % based on the total weight of the latex.

The w/o lattices are conventionally useful as de facto "concentrates" for EOR applications and other applications wherein it is desirable to increase the viscosity of a water source. The w/o latex is suitably stored, transported, etc. and then diluted immediately prior to or contemporaneously with subterranean injection by adding the latex to one or more water sources, "inverting" the w/o latex to form an aqueous polymer solution comprising 100 ppm to 10,000 ppm of the water soluble polymer by weight.

In some embodiments, the w/o latex or invertible latex is further concentrated post-polymerization, for storage and/or transportation purposes. The concentrated products are referred to as "reduced" lattices. Such reduced lattices may include about 70 wt % to 99 wt % solids. In embodiments, the reduced latex is a reduced invertible latex. In some embodiments, the water in the w/o latex is reduced or even substantially removed after polymerization to produce a reduced latex. Water is suitably stripped from the latex by distillation, vacuum drying, spray drying, or a combination thereof. In embodiments, the oil in the w/o latex is reduced or substantially removed and recycled after polymerization to produce a reduced latex. Oil is suitably stripped from the latex by distillation, vacuum drying, spray drying, or any combination thereof. In embodiments, both oil and water are reduced or even substantially removed from the reduced latex.

In embodiments, the inversion agent, one or more inversion surfactants, or a combination thereof is suitably added to the w/o latex at any time after polymerization is complete, for example prior to or after one or more of the foregoing concentration processes.

Inversion Surfactants

Inversion surfactants usefully employed in combination with the inversion agents comprise, consist essentially of, or consist of surfactants or blends thereof having an HLB of about 10 to 40, or about 10 to 35, or about 10 to 30, or about 10 to 25, or about 10 to 20, or about 10 to 15, or about 15 to 40, or about 20 to 40, or about 25 to 40, or about 30 to 40, or about 35 to 40, or about 15 to 35, or about 20 to 30. In some embodiments, the inversion surfactant is nonionic and includes one or more compounds comprising one or more ethoxy groups, propoxy groups, or a combination thereof. In some embodiments, the inversion surfactant is ionic and includes one or more carboxylate, sulfonate, phosphate, phosphonate, phosphonium, or ammonium moieties. In some embodiments, the inversion surfactant includes a linear or branched C8-C20 hydrocarbyl moiety or a mixture of such moieties. In some such embodiments, the inversion surfactant is an alkoxylated alcohol such as an ethoxylated, propoxylated, or ethoxylated/propoxylated alcohol, wherein the alcohol includes a linear or branched C8-C20 hydrocarbyl moiety or mixture of such moieties. In some such embodiments, the inversion surfactant includes about 4 and 40 ethylene oxide repeat units and 0 to about 10 propylene oxide repeat units. In some embodiments, the inversion surfactant includes a sorbitan moiety. In some embodiments, the inversion surfactant is a block copolymer or comprises a block copolymer. In some such embodiments, the block copolymer is linear, branched, or hyperbranched. Examples of suitable inversion surfactants are listed in McCutcheon's Emulsifiers & Detergents, MC Publishing Co., 2015 edition.

The inversion surfactant may be added before, concurrently with, or after addition of an inversion agent, described below, to a w/o latex. The inversion surfactant is added prior to, during, or after polymerization of the water soluble polymer to form the w/o latex. In embodiments, in order to facilitate inversion of a w/o latex, the inversion surfactant is added to a latex at about 0.1 wt % to 10 wt % based on the total weight of the w/o latex, or about 0.1 wt % to 8 wt %, 0.1 wt % to 6 wt %, or about 0.1 wt % to 4 wt %, 0.1 wt % to 2 wt %, or about 0.5 wt % to 5.5 wt %, or about 1.0 wt % to 5.0 wt %, or about 1.5 wt % to 4.5 wt %, or about 2.5 wt % to 3.5 wt %, or about 0.1 wt % to 5.5 wt %, or about 0.1 wt % to 5.0 wt %, or about 0.1 wt % to 4.5 wt %, or about 0.1 wt % to 4.0 wt %, or about 0.1 wt % to 3.5 wt %, or about 0.5 wt % to 4.0 wt %, or about 1.0 wt % to 4.0 wt %, or about 1.5 wt % to 3.0 wt %, or about 2.0 wt % to 4.0 wt %, or about 1.5 wt % to 2.5 wt %, or about 1.0 wt % to 3.0 wt %, based on the total weight of the w/o latex.

In some embodiments, the amount of inversion surfactant may be reduced when an inversion agent (discussed in detail below) is also added to a w/o latex, when compared to the complement of inversion surfactant required to obtain a stable polymer solution upon inverting the latex in the absence of the inversion agent. In embodiments, an inversion agent is added to a w/o latex and the amount of inversion surfactant is reduced by up to 50% compared to a w/o latex that does not include an inversion agent, for example about 5% to 50%, or about 5% to 40%, or about 5% to 30%, or about 5% to 25%, or about 5% to 20%, or about 5% to 15%, or about 5% to 10%. This result is surprising since the inversion agents are not surfactants, and therefore cannot take the place of an inversion surfactant chemically. The ability to reduce the amount of inversion surfactant is advantageous because in processes such as those required to produce a reduced latex, the surfactant properties associated with problems such as foaming and instabilities at low temperatures are eliminated by the use of the inversion agents comprising, consisting essentially of, or consisting of C1-C6 ricinoleate esters.

Inversion Agents

We have found that inversion agents comprising, consisting essentially of, or consisting of C1-C6 alkyl ricinoleates are usefully added to w/o lattices of water soluble polymers, along with one or more inversion surfactants, to form invertible lattices. The invertible lattices are characterized by the rapid and complete inversion thereof under conditions wherein the water source used to invert the latex is about −10° C. to 100° C., or about 0° C. to 80° C., or about 0° C. to 60° C., or about 5° C. to 100° C., or about 5° C. to 80° C., or about 5° C. to 60° C., or about 10° C. to 100° C., or about 10° C. to 80° C., or about 10° C. to 60° C.

By "complete inversion", it is meant herein that a polymer solution is characterized by a filter ratio (FR) of less than 1.5. FR is a measurement of the relative mass of gel particles and other instabilities commonly employed as indicator of completeness of an inversion. The test consists of measuring the time taken to filter given polymer solutions containing 1000 ppm (0.1 wt %) polymer through a 5 μm filter. To carry out this measurement, a polymer solution is contained in a steel bell filter ratio housing pressurized to and maintained at 20 psi. The filter has a diameter of 90 mm and a pore size of 5 microns. The amount of time (t) required to obtain 90 g (t90 g); 120 g (t120 g); 180 g (t180 g) and 210 g (t210 g) of filtrate are therefore measured and a filtration quotient (or filter ratio, FR) is defined, which is expressed as:

$$FR = \frac{t210\ g - t180\ g}{t120\ g - t90\ g}$$

wherein the time measurement accuracy is typically 0.1 second.

FR thus represents the capacity of the polymer solution to plug the filter for two equivalent consecutive mass samples. Conventional w/o lattices employed for formation of polymer solutions cannot achieve FR<1.5 even after several hours of stirring.

Thus, by "rapid" inversion, it is meant herein that the invertible lattices of the invention achieve FR<1.5 in about 10 seconds to 20 minutes after contacting an invertible latex with a sufficient amount of a water source to form a polymer solution having 100 ppm to 10,000 ppm of the water soluble polymer by weight, for example about 10 seconds to 10 minutes, or about 10 seconds to 5 minutes, or about 10 seconds to 3 minutes, or about 10 seconds to 1 minute, or about 10 seconds to 30 seconds.

In embodiments, inversion agents of the invention comprise, consist essentially of, or consist of the ricinoleate ester of a C1-C6 alcohol or mixture of such esters. In embodiments, the alkyl ricinoleate is methyl ricinoleate, ethyl ricinoleate, n-propyl ricinoleate, isopropyl ricinoleate, n-butyl ricinoleate or a branched analog thereof such as isobutyl-; n-pentyl ricinoleate or a branched or cyclic analog thereof such as cyclopentyl-, 2-methylbutyl-, and the like; or n-hexyl ricinoleate or a branched or cyclic analog thereof such as cyclohexyl-, 2-methylpentyl-, and the like. In some embodiments, the C1-C6 alcohol moiety further comprises a heteroatom, including but not limited to halogens such as chlorine, fluorine, and bromine.

We have surprisingly found that the invertible lattices are characterized by rapid and complete inversion in the range of about −10° C. to 10° C., for example about −5° C. to 10° C., or about 0° C. to 10°. Such a result is surprising because low temperatures are conventionally associated in the industry with formation of instabilities both in w/o lattices and during inversion thereof. The inversion agents are effective at preventing such instabilities even at low temperatures and thus provide superior performance in the field in cold regions of the globe or during winter conditions. Additionally, in embodiments, the invertible lattices themselves are stable at temperatures as low as 0° C., facilitating additional ease of use in the field. When stored above 0° C., the invertible lattices are shelf stable. Further, the invertible lattices are characterized by the rapid and complete inversion thereof under conditions wherein the water source used to invert the latex includes about 0.1 to 30 wt % total dissolved solids. Still further, the invertible lattices are characterized by the rapid and complete inversion thereof under conditions wherein the water source used to invert the latex is about −10° C. to 10° C. and further includes about 0.1 to 30 wt % total dissolved solids.

The presence of the inversion agent causes observable differences in the thermal transitions of the resulting dry polymer product when the invertible lattices are dried and then subjected to DSC analysis. This is demonstrated in the Examples below. In embodiments, an invertible latex includes at least one observable thermal transition between −10° C. and −50° C., that is not present in the same latex in the absence of methyl ricinoleate. The development of such thermal transitions is attributable to the presence of methyl ricinoleate. In some embodiments, an invertible latex includes two observable thermal transitions between −10° C. and −50° C., wherein neither transition is observable in the same latex in the absence of methyl ricinoleate. In other embodiments, an invertible latex includes three or more observable thermal transitions between −10° C. and −50° C., wherein one or more of the transitions were not observable in the same latex but in the absence of methyl ricinoleate. Without being limited by theory, it appears to us that in anionic lattices of AM/AA copolymers, observable thermal transitions between −10° C. and −50° C. correlate roughly to the pour point of the latex: that is, the lattices having one or more observable thermal transitions between −10° C. and −50° C. are also observed to flow at or above the thermal transition temperature.

The presence of the inversion agent in the invertible latex also reduces the bulk viscosity thereof compared to the bulk viscosity of a w/o latex to which is added a conventional inversion agent or a conventional inversion surfactant, or both, in a conventional amount. For example, bulk viscosity of the invertible lattices is about 30% to 95% of the bulk viscosity of the same latex prior to addition of a conventional amount of the inversion agent, when measured at 23° C. using a Brookfield viscometer with spindle #62 at 30 rpm. A "conventional" amount of inversion surfactant or inversion agent, mentioned above, is defined as about 5 wt % to 20 wt % inversion surfactant or inversion agent based on the weight of the w/o latex, further as disclosed in US 2014/0051620 wherein glycerol is added in an amount of from about 5 to about 20% by weight to an o/w latex to achieve a latex capable of inversion without developing instabilities during the process.

Thus, in embodiments, a latex having a first measured Brookfield viscosity at 23° C., spindle #62, 30 rpm, will have a second measured Brookfield viscosity (also measured at 23° C., spindle #62, 30 rpm) in the presence of 10 wt % methyl ricinoleate that is 30% to 95% lower than the first measured Brookfield viscosity, for example 40% to 95% lower, or 50% to 95% lower, or 60% to 95% lower, or 70% to 95% lower, or 80% to 95% lower, or 50% to 90% lower, or 50% to 80% lower, or 50% to 70% lower lower than the first measured Brookfield viscosity. Addition of an inversion surfactant may further lower the viscosity, for example by an additional 20% to 50%, or 20% to 40% or 20% to 30% based on the viscosity of the latex in the presence of the inversion agent alone.

In embodiments, invertible lattices having reduced bulk viscosity provides greater ease of pumping and transferring the invertible latex and/or the polymer flooding solution in the field. In embodiments, the inversion agent, or the inversion agent in combination with the inversion surfactant, achieves one or more of the following when compared to w/o lattices without the inversion agent: lowers bulk viscosity of the invertible latex, increases the speed of the inversion process, increases the completeness of the inversion process, or increases both the speed and completeness of the inversion process. In particular, these benefits are provided in the field wherein temperatures during inversion are between about −10° C. and 10° C.—for example, the water source, the equipment used for inverting, the invertible latex, or two or more thereof are present at a temperature of between about −10° C. and 10° C. during the inverting. Due to these advantages, the resulting polymer flooding solution may thereby demonstrate improved performance in the field.

In embodiments, the inversion agents, or the inversion agents in combination with one or more inversion surfactants, are used for inversion of an invertible latex under conditions wherein the water source used to invert the latex includes about 0.1 to 30 wt % total dissolved solids. Thus, disclosed herein is a method of forming a polymer solution, the method comprising adding an inversion surfactant and an inversion agent to a w/o latex to form an invertible latex, and then adding a water source to the invertible latex to form a polymer solution, wherein the water source comprises about 0.1 wt % to 30 wt % total dissolved solids.

In embodiments, the inversion agents, or the inversion agents in combination with one or more inversion surfactants, are used for inversion of an invertible latex under conditions wherein the water source used to invert the latex is about −10° C. to 100° C.; or most advantageously about −10° C. to 10° C. Thus, disclosed herein is a method of forming a polymer solution, the method comprising adding an inversion surfactant and an inversion agent to a w/o latex to form an invertible latex, and then adding a water source to the invertible latex to form a polymer solution, wherein the water source comprises a temperature of about −10° C. to 100° C.; or about −10° C. to 10° C. In some such embodiments, the water source further comprises about 0.1 wt % to 30 wt % total dissolved solids.

In embodiments, the inversion agent is added to a latex in an amount sufficient to facilitate the inversion of a w/o latex. The amount is not so high that it causes the emulsion to "break", that is, become unstable. In embodiments, the inversion agent is added to a latex in an amount less than amounts of known inversion agents. For example, the presently disclosed inversion agent may be added in an amount of from about 1 wt % to 10 wt % based on the total weight of the w/o latex. In any one or more embodiments recited herein, the invertible lattices comprise a w/o latex and at least one inversion surfactant, wherein the amount of inversion surfactant recited herein refers to the amount of a single inversion surfactant or the total amount of a mixture of two or more thereof. In any one or more embodiments, the invertible lattices further comprise the inversion agent which is a single alkyl ricinoleate or a mixture of two or more alkyl ricinoleates, such as a mixture of ethyl ricinoleate and n-butyl ricinoleate.

In embodiments, the inversion agent is added to a w/o latex at about 0.1 wt % to 20.0 wt % based on the total weight of the w/o latex, or about 0.1 wt % to 15.0 wt %, or about 0.1 wt % to 10.0 wt %, or about 0.1 wt % to 9.0 wt %, or about 0.1 wt % to 8.0 wt %, or about 0.1 wt % to 7.0 wt %, or about 0.1 wt % to 6.0 wt %, or about 1.0 wt % to 10 wt %, or about 1.0 wt % to 9.0 wt %, or about 1.0 wt % to 8.0 wt %, or about 1.0 wt % to 7.0 wt %, or about 1.0 wt % to 6.0 wt %, or about 1.0 wt % to 5.0 wt %, or about 2.0 wt % to 10.0 wt %, or about 2.0 wt % to 9.0 wt %, or about 2.0 wt % to 8.0 wt %, or about 2.0 wt % to 7.0 wt %, or about 3.0 wt % to 10.0 wt %, or about 3.0 wt % to 9.0 wt %, or about 3.0 wt % to 8.0 wt %, or about 3.0 wt % to 7.0 wt %, or about 4.0 wt % to 10.0 wt %, or about 4.0 wt % to 9.0 wt %, or about 4.0 wt % to 8.0 wt %, or about 4.0 wt % to 7.0 wt %, based on the total weight of the w/o latex.

The inversion agent is added to a w/o latex at an inversion surfactant:inversion agent wt:wt ratio of about 20:1 to 1:1, or about 15:1 to 1:1, or about 10:1 to 1:1, or about 5:1 to 1:1, or about 2:1 to 1:1, or about 20:1 to 2:1, or about 20:1 to 5:1, or about 20:1 to 10:1, or about 20:1 to 15:1, or about 15:1 to 5:1, or about 10:1 to 5:1, or about 10:1 to 2:1, or about 5:1 to 2:1.

The inversion surfactant and inversion agent are added to a w/o latex in a combined amount ([inversion surfactant+ inversion agent]) of about 0.1 wt % to 20.0 wt % based on the total weight of the w/o latex to form an invertible latex, for example about 0.5 wt % to 18.0 wt %, or about 1.0 wt % to 16.0 wt %, or about 1.5 wt % to 14.0 wt %, or about 2.0 wt % to 12.0 wt %, or about 2.5 wt/to 10.0 wt %, or about 3.0 wt % to 8.0 wt %, or about 3.5 wt % to 7.5 wt %, or about 4.0 wt % to 7.0 wt %, or about 4.5 wt % to 6.5 wt %, or about 0.1 wt % to 18.0 wt %, or about 0.1 wt/to 16.0 wt %, or about 0.1 wt/to 14.0 wt %, or about 0.1 wt % to 12.0 wt %, or about 0.1 wt % to 10.0 wt %, or about 0.1 wt/o to 8.0 wt %, or about 0.1 wt % to 7.5 wt %, or about 0.1 wt % to 7.0 wt %, or about 0.1 wt/o to 6.5 wt %, or about 0.5 wt/o to 20.0 wt %, or about 1.0 wt/o to 20.0 wt %, or about 1.5 wt/o to 20.0 wt %, or about 2.0 wt % to 20.0 wt %, or about 2.5 wt % to 20.0 wt %, or about 3.0 wt % to 20.0 wt %, or about 3.5 wt % to 20.0 wt %, or about 4.0 wt % to 20.0 wt %, or about 4.5 wt % to 20.0 wt %, or about 5.0 wt % to 20.0 wt %, or about 5.5 wt % to 20.0 wt %, or about 6.0 wt/o to 20.0 wt %, or about 6.5 wt % to 20.0 wt %, or about 7.0 wt % to 20.0 wt %, or about 7.5 wt/o to 20.0 wt %, or about 8.0 wt % to 20.0 wt %, based on the total weight of the w/o latex.

Invertible Lattices

Addition of an inversion agent of the present disclosure to a conventional w/o latex results in an invertible latex. In embodiments, an invertible latex further comprises one or more inverting surfactants. The inversion surfactants may be added to the w/o latex before, during, or after polymerization. However, it is important to add the inversion agents to the w/o latex after polymerization is complete. This is because the unsaturated moiety of the ricinoleate interferes with the homolytic addition polymerization of the water soluble polymer, which in turn leads to unacceptably low molecular weight. Low molecular weight polymers are ineffective for building viscosity of water sources, particularly at 10,000 ppm (1 wt %) or less, so any sacrifice of molecular weight would be unacceptable with respect to the intended end use of the invertible latex. However, since the inverting surfactant may be suitably added to the w/o latex at any time, the inverting surfactant may added before, during, or after addition of the inverting agent.

The invertible lattices of the invention are stable. In embodiments the invertible lattices are shelf stable. The invertible lattices do not exhibit any observed signs of gross phase separation, coagulation, or precipitation for at least 24 hours at 20° C. In embodiments, the invertible latex is stable under common ambient conditions for at least 1 day at 20° C.-25° C., or for at least 2 days at 20° C.-25° C., or for at least 1 week at 20° C.-25° C., or for at least 2 weeks at 20° C.-25° C., or for at least 1 month at 20° C.-25° C., or for at least 2 months at 20° C.-25° C., or for at least 1 day at 50° C., or for at least 2 days at 50° C., or for at least 5 days at 50° C., or for at least 10 days at 50° C., or for at least 30 days at 50° C., or for at least 1 day at 0° C., or for at least 2 days at 0° C., or for at least 5 days at 0° C., or for at least 10 days at 0° C., or for at least 30 days at 0° C., or for at least 1 day at 5° C., or for at least 2 days at 5° C., or for at least 5 days at 5° C., or for at least 10 days at 5° C., or for at least 30 days at 5°, or for at least 1 day at 10° C., or for at least 2 days at 10° C., or for at least 5 days at 10° C., or for at least 10 days at 10° C., or for at least 30 days at 10° C.

The invertible lattices of the invention invert rapidly and completely when contacted with a water source to yield a polymer solution. In embodiments the water source comprises one or more of low temperature and high total dissolved solids. Numerous advantages are realized by use of the invertible lattices of the invention; principal of these is the time savings realized when rapid and complete inversion replaces multi-step, slow, or incomplete inversion in the field. Both the invertible lattices and the resulting polymer solutions are characterized by the absence of latex instability or inversion instability, thereby preventing or reducing downtime in the field necessitated by plugged or fouled equipment, damaged reservoirs, and plugged subterranean formations or sections thereof.

During inversion, a water source is contacted with an invertible latex in one or more steps including one or more mixing and/or shearing processes to result in a polymer flooding solution having 1 wt % polymer or less, specifically about 100 ppm by weight (0.01 wt %) to 10,000 ppm by weight (1.00 wt %). In some embodiments, the invertible lattices of the invention provide for a simple, one-step inversion process characterized by absence of instabilities manifested as coagulation or precipitation of polymer or gross phase separation of the water phase from the oil phase prior to dissolution. It is a feature of the invention that the invertible lattices of the invention provide for a simple, one-step inversion process in the presence of water sources contacted with the invertible latex wherein the temperature of the invertible latex, the water source, or both are about −10° C. to 100° C., or about 0° C. to 100° C., or about 0° C. to 80° C., or about 0° C. to 60° C., or about −10° C. to 10° C., or about 0° C. to 10° C. It is a feature of the invention that the invertible lattices of the invention provide for a simple, one-step inversion process in the presence of water sources contacted with the invertible latex wherein the water source contacting the invertible latex includes about 0.1 to 30 wt % total dissolved solids. It is a feature of the invention that the invertible lattices of the invention provide for a simple, one-step inversion process wherein the water source contacting the invertible latex includes about 0.1 to 30 wt % total dissolved solids and further contacts the inversion composition at about −10° C. to 10° C.

The polymer flooding solution typically includes about 1 wt % or less of polymer, other (residual) compounds from the inverted latex, and any dissolved solids present in the water source. The polymer flooding solutions of the invention are characterized by absence of gel particles, absence of gross phase separation, and/or absence other manifestations of inversion instability of w/o lattices.

Inversion of the invertible lattices to form the polymer flooding solutions is accomplished using conventional techniques and equipment, which is an unexpected benefit of employing the inversion agent of the invention using water sources that are high temperature, high total dissolved solids, or both high temperature/high total dissolved solids water sources. In some embodiments, inversion of invertible lattices to form the polymer flooding solutions is suitably accomplished in a single step including dilution and mixing of the invertible latex with the water source to the target polymer concentration in the polymer flooding solution. In other embodiments, inversion of invertible lattices to form the polymer flooding solutions is suitably accomplished in two dilution/mixing steps to reach the target polymer concentration.

In some embodiments, the inversion of the invertible lattices is carried out to reach a target polymer solution concentration of 100 ppm to 10,000 ppm by weight and FR<1.5 in about 10 seconds to 20 minutes, for example 10 seconds to 15 minutes, 10 seconds to 30 seconds, 10 seconds to 1 minute, 10 seconds to 2 minutes, 10 seconds to 3 minutes, 10 seconds to 4 minutes, 10 seconds to 5 minutes, 10 seconds to 6 minutes, 10 seconds to 7 minutes, 10 seconds to 8 minutes, 10 seconds to 9 minutes, 10 seconds to 10 minutes, 10 seconds to 15 minutes, 1 minute to 14 minutes, 1 to 13 minutes, 1 to 12 minutes, 1 to 11 minutes, 1 to 10 minutes, 1 to 9 minutes, 1 to 8 minutes, 1 to 7 minutes, 1 to 6 minutes, 1 to 5 minutes, 2 minutes to 15 minutes, 3 minutes to 15 minutes, 4 minutes to 15 minutes, 5 minutes to 15 minutes, 6 minutes to 15 minutes, 7 minutes to 15 minutes, 8 minutes to 15 minutes, 9 minutes to 15 minutes, 10 minutes to 15 minutes, 2 minutes to 10 minutes, 2 minutes to 9 minutes, 2 minutes to 8 minutes, 3 minutes to 10 minutes, 3 minutes to 9 minutes, 3 minutes to 8 minutes, 4 minutes to 10 minutes, 4 minutes to 9 minutes, 4 minutes to 8 minutes, or 4 minutes to 7 minutes.

In some embodiments the inversion is conducted by contacting the water source with the invertible latex at a temperature of about −10° C. to 10° C., or wherein the invertible latex is present at a temperature of about −10° C. to 10° C., or wherein the water source is present at a temperature of about −10° C. to 10° C., or two or more thereof. In embodiments, the water source includes about 0.1 to 30 wt % total dissolved solids. In embodiments, the water source includes about 0.1 to 30 wt % total dissolved solids and a temperature of −10° C. to 10° C.

After inversion, the polymer flooding solutions comprise about 100 ppm to 10,000 ppm (0.01 wt % to 1.00 wt %) polymer, or about 200 ppm to 5000 ppm, or about 200 ppm to 4000 ppm, or about 200 ppm to 3000 ppm, or about 200 ppm to 2500 ppm polymer. In some embodiments the water source contacts the invertible latex at a temperature of about −10° C. to 100° C., or about −10° C. to 60° C., or about 0° C. to 10° C., or about −10° C. to 10° C. In embodiments, the water source includes about 0.1 to 30 wt % total dissolved solids. In embodiments, the water source includes about 0.1 to 30 wt % total dissolved solids and further contacts the inversion composition at about −10° C. to 10° C.

A water source is water or a water solution having up to about 30.0 wt % total dissolved solids (TDS), or about 0.1 wt % to 29.0 wt %, or about 0.5 wt % to 28.0 wt %, or about 1.0 wt % to 27.0 wt %, or about 2.0 wt % to 25.0 wt %, or about 3.0 wt % to 20.0 wt % TDS. "High TDS" water sources have TDS of at least about 1 wt %. Thus in embodiments a water source includes one or more dissolved solid materials including but not limited to salts, ions, buffers, acids, bases, surfactants, compounds employed in the water used in mining operations, or other dissolved, dispersed, or emulsified compounds, materials, components, or combinations thereof. Nonlimiting examples of water sources include hard water, produced water from mining operations, brackish water, sea water, municipal waste water, tap water, "gray water", and the like. Water sources having high TDS and high temperature are often encountered in use for EOR applications. For example, hydraulic fracturing and conventional oil recovery often results in produced water having high TDS, temperatures in excess of 60° C., or both; rather than use fresh water, in such situations it is economical to reuse the produced water as the water source for inversion processes.

In some embodiments, the method of inverting the invertible lattices involves conventional inverting equipment. While inverting a latex is often accomplished in the field using high shear, stepwise dilution for efficiency in achieving full dilution and hydration of a polymer at the desired use level, we have found that relatively low shear mixing is advantageous in some embodiments for inverting the invertible lattices of the invention. Such techniques are advantageous because avoiding some or all shear on the polymer chains during dissolution results in a higher final viscosity of the polymer flooding solution by reducing or eliminating chain scission of the high molecular weight polymers. It is a feature of the invertible lattices of the invention that low-shear techniques that avoid substantial amounts of chain scission are suitably used in rapid inversion to result in polymer flooding solutions characterized by lack of manifestations of instability as discussed above.

Low shear inverting equipment employed to invert the invertible lattices of the invention include static mixers. For example, U.S. Pat. No. 8,383,560 describes an apparatus employing a two-step inversion apparatus. In the first step, a w/o polymer latex is diluted to yield a polymer solution having about 5000 ppm to 20,000 ppm polymer solids employing a first static mixer having a pressure drop of at least 2 bars between the inlet and outlet thereof. In the second step, the partially diluted latex is applied to a second static mixer having a pressure drop of at least 1 bar between the inlet and outlet, and is further diluted to result in a polymer solution having between 500 and 3000 ppm, in practice between 1000 and 2000 ppm polymer solids. Such a two-step dilution system is usefully employed in conjunction with the invertible lattices of the present invention. Conventional static mixers, as described in U.S. Pat. No. 8,383,560 are usefully employed; other low shear mixers and pumps are used in addition to, or as a replacement for, one or more static mixers described in U.S. Pat. No. 8,383,560.

Surprisingly, we have further found that it is possible to achieve a single stage inversion of the invertible lattices by employing the inversion agents of the invention: that is, a single dilution step with a water source is usefully employed to dilute the invertible lattices to form a polymer flooding solution at the final use concentration of about 100 ppm to 10,000 ppm. No intermediate or step-down dilution is required to form the polymer flooding solution. The polymer flooding solutions of the invention are characterized by the substantial absence of gels and solution instabilities in the field. This finding is significant because conventional w/o lattices, subjected to a single dilution step in the field, result in substantial gel particles and/or solution instabilities that cause plating out or plugging of equipment used to carry out EOR by polymer flooding. Conventional water-in-oil EOR lattices require two or more dilution steps and several hours to complete inversion to result in a polymer solution.

In some embodiments, after the invertible lattices are contacted with water source to form a polymer flooding solution in a single dilution step, the polymer continues to build viscosity (even after achieving FR<1.5) for about 0.5 minute to 120 minutes, or about 0.75 minute to 115 minutes, or about 1 minute to 110 minutes, or about 2 minutes to 105 minutes, or about 5 minutes to 100 minutes, or about 10 minutes to 90 minutes, or about 15 minutes to 80 minutes, or about 5 minutes to 70 minutes, or about 10 minutes to 70 minutes, or about 20 minutes to 70 minutes, or about 30 minutes to 70 minutes, or about 40 minutes to 70 minutes, or about 50 minutes to 70 minutes, or about 5 minutes to 60 minutes, or about 10 minutes to 60 minutes, or about 20 minutes to 60 minutes, or about 30 minutes to 60 minutes, or about 40 minutes to 60 minutes.

In a nonlimiting example of an EOR application, a w/o latex is applied to a reservoir as follows. An invertible latex is introduced to a mixing apparatus, wherein a water source is contemporaneously introduced into the apparatus in an amount suitable to form a polymer solution of the desired concentration. A water source, such as a low temperature water source, a high total dissolved solids water source, or a low temperature/high total dissolved solids water source is added to the invertible latex in an amount suitable to target the selected final polymer concentration. The water source is added prior to or contemporaneously with the carrying out of one or more mixing processes to thoroughly mix the invertible latex with the water source and accomplish the inversion.

In some embodiments, inversion of the invertible lattices is suitably carried out using conventional equipment and methods used to invert lattices in the field. Employing conventional equipment and methods familiar to those of skill in inverting w/o lattices for EOR applications, it is possible to invert the invertible latex in less than 5 minutes, for example about 1 second to 5 minutes, or about 10 seconds to 5 minutes, or about 20 seconds to 5 minutes, or about 30 seconds to 5 minutes, or about 40 seconds to 5 minutes, or about 50 seconds to 5 minutes, or about 1 minute to 5 minutes, or about 2 minutes to 5 minutes, or about 1 second to 4 minutes, or about 1 second to 3 minutes, or about 1 second to 2 minutes, or about 1 second to 1 minute, or about 1 second to 50 seconds, or about 1 second to 40 seconds, or about 1 second to 30 seconds, or about 1 second to 20 seconds, or about 1 second to 10 seconds.

In some embodiments, inversion is suitably carried out by subjecting the invertible lattices of the invention to a single-step inversion by diluting the lattices with a water source and efficiently mixing the water source and the invertible latex in a single step. Devices suitable to achieve a one-step inversion include static mixers, paddle or blade mixers, mixing pumps, and the like. Any devices conventionally employed for w/o latex inversion are suitably employed to invert the invertible lattices of the invention.

In the industry, w/o lattices such as those used for EOR application are also useful as flocculants and flow modifiers in water treatment, papermaking, and mining extraction and refining/converting processes. For example, many water-soluble polymers used for EOR applications are also used as rheology modifiers for waterborne coatings or as flocculants in e.g. water treatment or papermaking applications. Accordingly, the invertible lattices are also usefully employed in one or more papermaking applications using a Fourdrinier or inclined Fourdrinier apparatus, wherein water-based furnishes dispensed onto a wire can include an EOR-type polymer to improve the rheological profile of the furnish as dictated by machine or application parameters. In such applications, the invertible lattices of the invention are advantageously employed due to rapid inversion upon addition to a furnish (a water-based dispersion of fibers) to result in a polymer solution similar to the polymer flooding solutions as described above. "Papermaking" as a term of art includes making paper—that is, cellulose based mats—as well as other nonwoven fibrous mats such as filtration media that employ e.g. thermoplastic, bicomponent, and/or glass fibers in addition to or instead of cellulose based fibers. One of skill will appreciate that the invertible lattices are advantageously employed in conjunction with industrial applications and processes such as wastewater treatment, mining extraction and refining processes, or energy extraction and refining processes.

EXPERIMENTAL

Water Source. Synthetic tap water was prepared by blending the components of Table 2. The water is used for inversion testing (dilution of lattices) in the Examples below.

TABLE 2

Components of synthetic tap water.

| Name | Mass (g) |
| --- | --- |
| $Na_2SO_4$ (anhydrous) | 1.4 |
| $CaCl_2 \cdot 2H_2O$ | 10 |
| $MgCl_2 \cdot 6H_2O$ | 6.3 |
| KCl | 0.6 |
| NaCl | 86.6 |
| DI water | 960.1 |

Procedure A. Changes in solution viscosity during an inversion process are measured using a torque monitor. The torque monitor is a DC stir motor connected to a controller that reports the torque (DC voltage) required to maintain a constant stir speed, and also to a computer to record the torque reading as a function of time. The torque monitor tests are conducted in a 600 ml jacketed glass beaker and with a flat paddle stirrer connected to the motor, a disposable syringe is used to add a latex to the synthetic tap water while stirring at 400 rpm to result in 500 g of a test solution having 0.5 wt. % (5000 ppm) of the latex polymer. These tests are run using 500 g of a test solution with stirring rate of 400 rpm. Synthetic tap water is added to the beaker first, and the temperature is adjusted to 23° C., 7° C. and 4° C. by circulating a temperature controlled bath through the beaker jacket until the target test temperature is reached. Then a w/o latex is injected into the water using a syringe and the torque is then continuously recorded for 30 minutes. The amount of w/o latex injected is selected to provide 0.5 wt % (5000 ppm by weight) polymer in the beaker. After the 30 minutes, the final torque reading is noted and the inversion product is observed for signs of coagulum and/or undissolved materials.

Procedure B. Changes in solution viscosity during an inversion process are measured using a Brookfield viscometer. At ambient laboratory temperature (about 20° C.-23° C.) a disposable syringe is used to add a latex to the synthetic tap water while stirring at 800 rpm to result in 200 g of a test solution having 0.5 wt. % (5000 ppm) of the latex polymer. Stirring is continued for one minute, then viscosity of the mixture is measured using Brookfield viscometry, #62 spindle, 30 rpm; this measurement is reported as "to" viscosity. Then the mixture is allowed to stand without stirring between additional measurements, which are taken at 5 mins ($t_5$), ten minutes ($t_{10}$), 15 minutes ($t_{15}$), and 30 minutes ($t_{30}$).

Example 1

A w/o latex was prepared having 42.86 wt % of a copolymer of 50 mol % acrylamide and 50 mol % 2-(acryloyloxy)-N,N,N-trimethylethanammonium chloride; water; an oil; and a nonionic polymeric latex surfactant combination of sorbitan oleate (CAS No.: 1338-43-8; HLB of 4.3), HYPERMER® B-246 (polymeric surfactant obtained from Croda Inc. of Edison, N.J.; HLB 5.5) and a maleic anhydride-octadecene copolymer having an HLB of about 1. To each 98 g aliquot of latex was added 2 g of an inversion surfactant, which is mixture of C10-C16 alcohol ethoxylates having an average of about 7 ethylene oxide repeat units, to form latex 1A. An aliquot of the 1A latex was subjected to inversion Procedure B. A second aliquot of the 1A latex was combined with 10 wt % methyl ricinoleate based on the weight of the latex to form latex 1B. An aliquot of the 1B latex was also subjected to inversion Procedure B.

The resulting Brookfield viscosity measurements of inversions 1A and 1B at $t_0$-$t_{15}$ are shown in Table 3. The 1A and 1B lattices produced nearly identical 0.5 wt % polymer solution viscosities by $t_{15}$ mark, but the 1B latex was already near peak viscosity by the time the to measurement was made: that is, inversion of latex 1B to form a polymer solution suitable for injection was complete or nearly complete in less than 1 minute after combining the water source and the latex.

TABLE 3

Brookfield viscosity measurements according to Procedure B, for lattices 1A and 1B.

| Brookfield viscosity, Procedure B, cP | Inversion time, min | Latex 1A | Latex 1B |
| --- | --- | --- | --- |
| $t_0$ | 1 | 64.8 | 337 |
| $t_5$ | 5 | 244 | 369 |
| $t_{10}$ | 10 | 363 | 363 |
| $t_{15}$ | 15 | 395 | 351 |

Example 2

The latex 1A was subjected to thin film evaporation to result in latex 2A having a polymer concentration of between 63 wt % and 70 wt %. Similarly, latex 1B was subjected to thin film evaporation to result in latex 2B having the same or substantially the same polymer concentration as latex 2A.

Lattices 2A and 2B were subjected to Procedure B and the resulting Brookfield viscosity measurements of inversions 2A and 2B at t0-t$_{15}$ are shown in Table 4. At to (1 minute inversion time), the latex 2A inversion was 25 cP, while latex 2B inversion was greater than 150 cP. Further, at t$_{15}$, latex 2A was nearly 300 cP while latex 2B close to 600 cP. The rate of inversion of 2B is faster than that of 1B.

TABLE 4

Brookfield viscosity measurements according to Procedure B, for lattices 2A and 2B.

| Brookfield viscosity, Procedure B, cP | Inversion time, min | Latex 2A | Latex 2B |
|---|---|---|---|
| t$_0$ | 1 | 25 | 172 |
| t$_5$ | 5 | 86.6 | 436 |
| t$_{10}$ | 10 | 205 | 536 |
| t$_{15}$ | 15 | 275 | 580 |

Example 3

Water-in-oil lattices were prepared according to the procedure of Example 1 except that instead of the block copolymer latex surfactant, a mixture of sorbitan oleate and TWEEN® 61 (ethoxylated sorbitan ester of stearic acid, obtained from Croda Inc.) were used in combination as the latex surfactant. To each 98 g aliquot of latex was added 2 g of an inversion surfactant, which is mixture of C10-C16 alcohol ethoxylates having an average of about 7 ethylene oxide repeat units, to form latex 3A. An aliquot of the 3A latex was subjected to inversion Procedure B. A second aliquot of the 3A latex was combined with 10 wt % methyl ricinoleate based on the weight of the latex to form latex 3B; latex 3B was then subjected to inversion Procedure B. A third aliquot of the 3A latex was combined with 10 wt % methyl esters of canola oil (principal fatty acid components: oleic acid (primary), linoleic acid, linolenic acid, and saturated fatty acids) based on the weight of the latex to form latex 3C; latex 3C was then subjected to inversion Procedure B. A fourth aliquot of the 3A latex was combined with 10 wt % methyl esters of soybean oil (principal fatty acid components: linoleic acid (primary), oleic acid, linolenic acid, and saturated fatty acids) based on the weight of the latex to form latex 3D; latex 3D was then subjected to inversion Procedure B.

The resulting Brookfield viscosity measurements of inversions 3A-3D at t$_0$-t$_{15}$ are shown in FIG. 1. While each of the fatty acid methyl esters was beneficial when added to latex 3A, methyl ricinoleate produced significantly greater rate of inversion to result in a polymer solution.

Example 4

The latex of 1A latex of Example 1 was combined with 10 wt % methyl esters of canola oil based on the weight of the latex to form latex 1C; latex 1C was then subjected to inversion Procedure B. A fourth aliquot of the 1A latex of Example 1 was combined with 10 wt % methyl esters of soybean oil based on the weight of the latex to form latex 1D; latex 1D was then subjected to inversion Procedure B.

Figure 2:
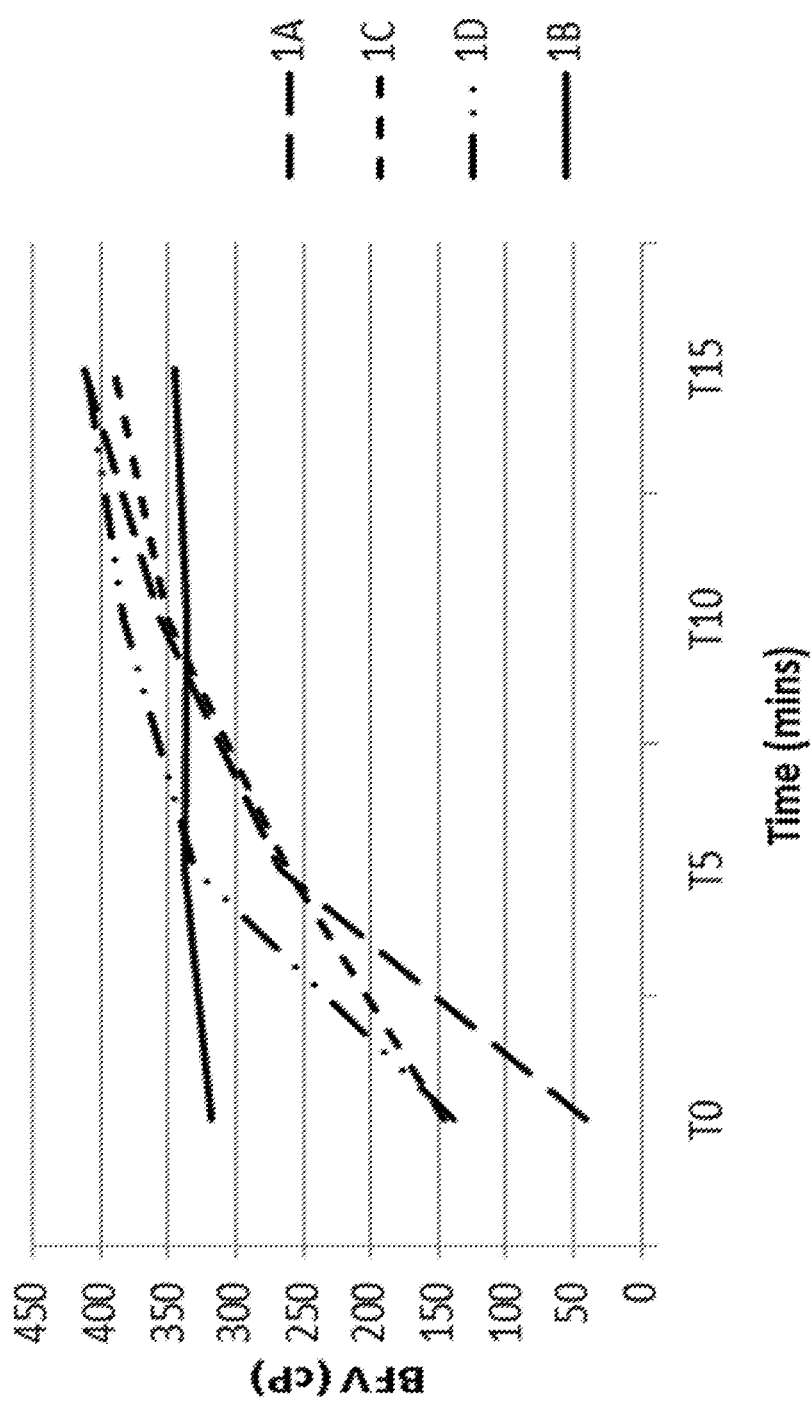
FIG. 2 shows another plot of Brookfield viscosity (cP) as a function of time, showing the inversion behavior of w/o lattices of the invention when inverted according to Procedure B.

The resulting Brookfield viscosity measurements of inversions 1A-1D at t$_0$-t$_{15}$ are shown in FIG. 2, wherein 1A and 1B results are added to FIG. 2 with further reference to Table 1. While each of the fatty acid methyl esters was beneficial when added to latex 1A, methyl ricinoleate produced significantly greater rate of inversion to result in a polymer solution.

Example 5

Water-in-oil lattices were prepared according to the procedure of Example 1, except that the monomers employed in the polymerization were 70 mol % acrylamide and 30 mol % sodium acrylate. Addition of the inversion surfactant completed formation of latex 4A. An aliquot of the 4A latex was subjected to inversion Procedure B. A second aliquot of the 4A latex was combined with 10 wt % methyl ricinoleate based on the weight of the latex to form latex 4B; latex 4B was then subjected to inversion Procedure B. A third aliquot of the 4A latex was combined with 10 wt % methyl esters of canola oil based on the weight of the latex to form latex 4C; latex 4C was then subjected to inversion Procedure B. A fourth aliquot of the 4A latex was combined with 10 wt % methyl esters of soybean oil based on the weight of the latex to form latex 4D; latex 4D was then subjected to inversion Procedure B.

Figure 3:
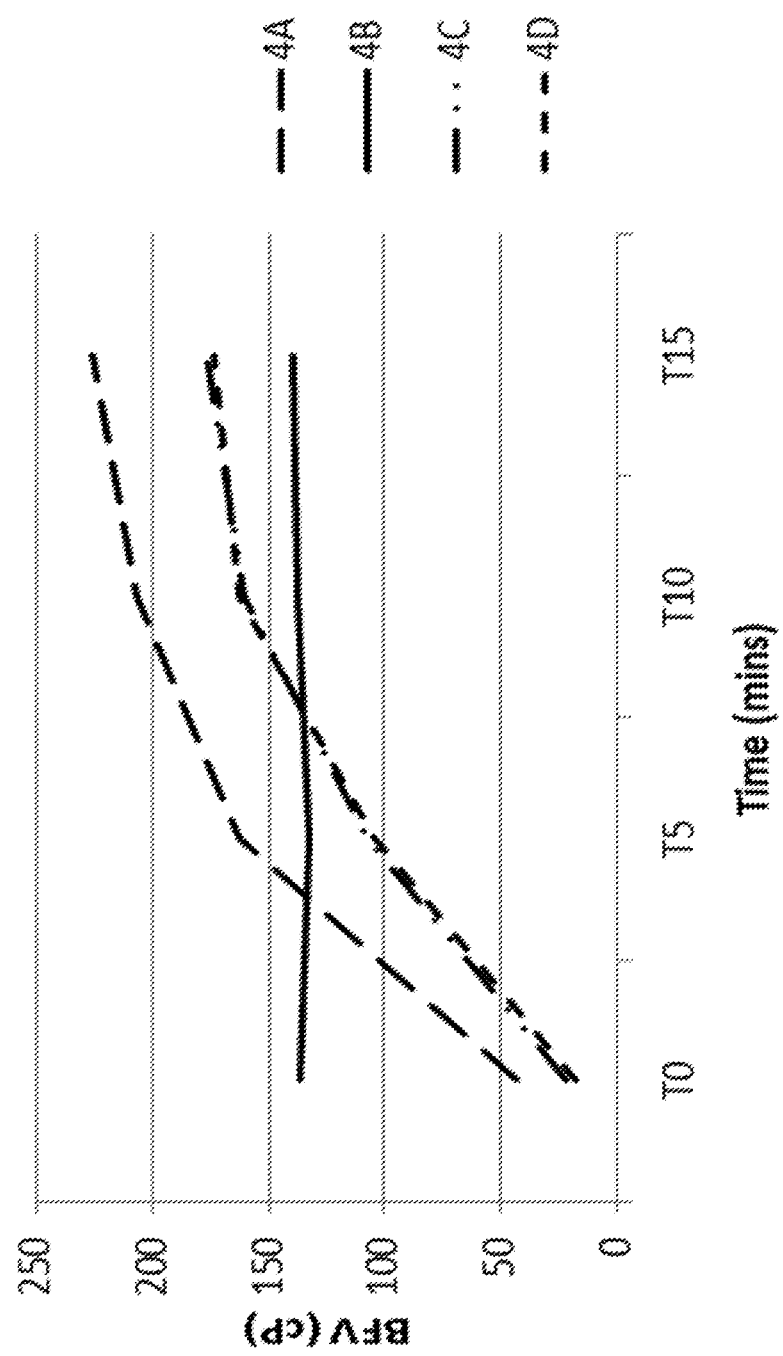
FIG. 3 shows another plot of Brookfield viscosity (cP) as a function of time, showing the inversion behavior of w/o lattices of the invention when inverted according to Procedure B.

The resulting Brookfield viscosity measurements of inversions 4A-4D at t$_0$-t$_{15}$ are shown in FIG. 3. While each of the fatty acid methyl esters was beneficial when added to latex 4A, methyl ricinoleate produced significantly greater rate of inversion to result in a polymer solution.

Example 6

Water-in-oil lattices were prepared according to the procedure of Example 3, and the inversion surfactant was added to form latex 5A which is the same as latex 3A of Example 3. An aliquot of the 5A latex was subjected to inversion Procedure A at 7° C. A second aliquot of the 5A latex was combined with 10 wt % methyl ricinoleate based on the weight of the latex to form latex 5B; latex 5B was then subjected to inversion Procedure A at 7° C. A third aliquot of the 5A latex was combined with 7 wt % methyl ricinoleate based on the weight of the latex to form latex 5C; latex 5C was then subjected to inversion Procedure A at 7° C. A fourth aliquot of the 5A latex was combined with 5 wt % methyl ricinoleate based on the weight of the latex to form latex 5D; latex 5D was then subjected to inversion Procedure A at 7° C., A fifth aliquot of the 5A latex was combined with 3 wt % methyl ricinoleate based on the weight of the latex to form latex 5E; latex 5E was then subjected to inversion Procedure A at 7° C. Finally, a sixth aliquot of the 5A latex was combined with 1 wt % methyl ricinoleate based on the weight of the latex to form latex 5F; latex 5F was then subjected to inversion Procedure A at 7° C.

Figure 4:
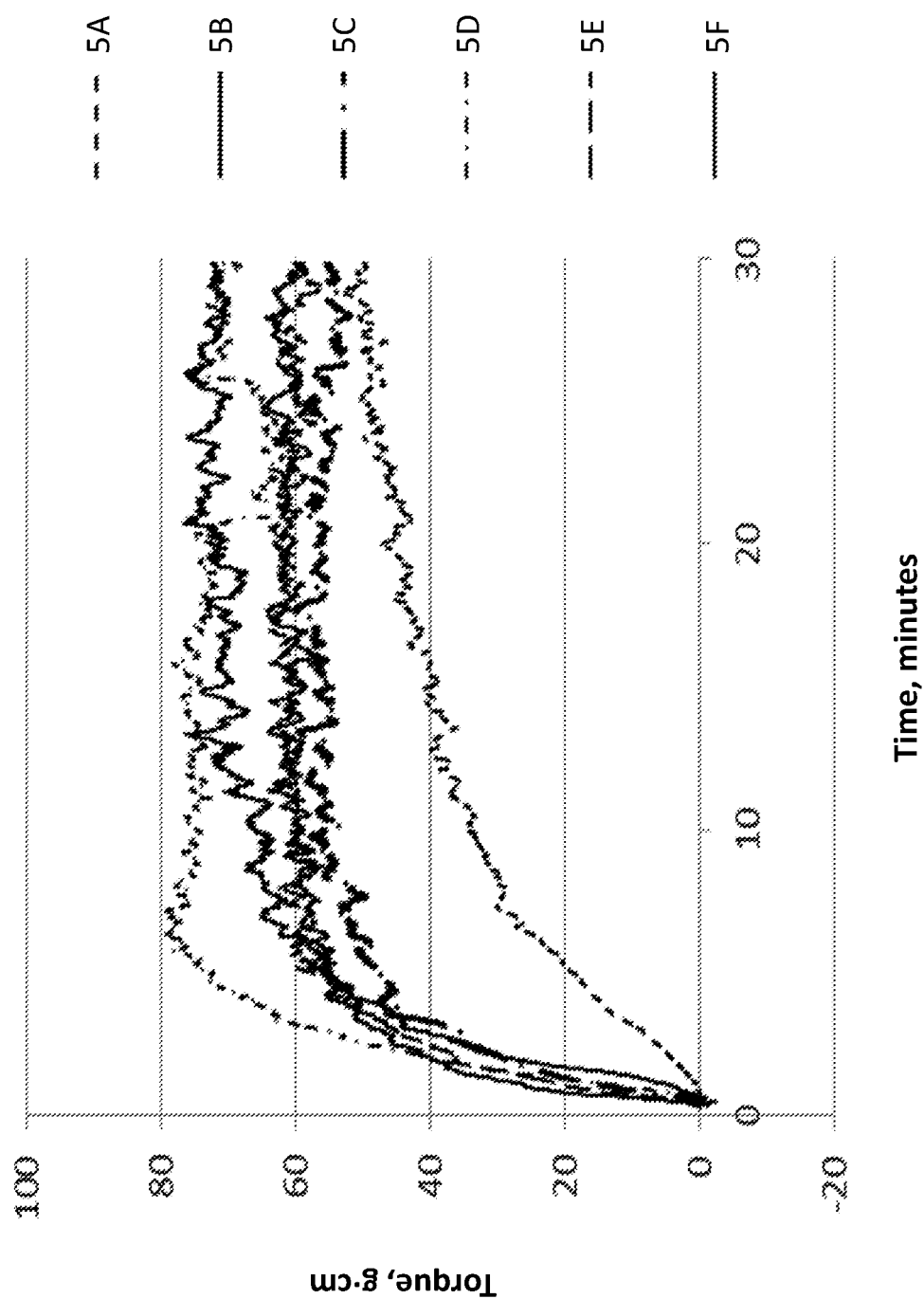
FIG. 4 shows a line graph of torque (g·cm) at 7° C. as a function of time, showing the inversion behavior of w/o lattices of the invention when inverted according to Procedure A.

The resulting torque measurements are shown in FIG. 4. Lattices 5B-5E provided rapid inversion as manifested in higher viscosities at about 5 minutes or less for each of these lattices when compared to latex 5A. For example: latex 5D reached full torque at about 5 minutes; by comparison, latex 5A was still building viscosity at about 30 minutes and was not close to the viscosity reached in the case of latex 5D after 5 minutes.

Example 7

A water-in-oil latex that is the same as latex 4A of Example 5 was prepared according to the procedure of Example 5, and labelled latex 6A. An aliquot of the 6A latex was subjected to inversion Procedure A at 4° C. A second aliquot of the 6A latex was combined with 10 wt % methyl ricinoleate based on the weight of the latex to form latex 6B; latex 6B was then subjected to inversion Procedure A at 4° C. A third aliquot of the 6A latex was combined with 7 wt % methyl ricinoleate based on the weight of the latex to form latex 6C; latex 6C was then subjected to inversion Procedure A at 4° C. A fourth aliquot of the 6A latex was combined with 5 wt % methyl ricinoleate based on the weight of the latex to form latex 6D; latex 6D was then subjected to inversion Procedure A at 4° C. A fifth aliquot of the 6A latex was combined with 3 wt % methyl ricinoleate based on the weight of the latex to form latex 6E; latex 6E was then subjected to inversion Procedure A at 4° C. Finally, a sixth aliquot of the 6A latex was combined with 1 wt % methyl ricinoleate based on the weight of the latex to form latex 6F; latex 6F was then subjected to inversion Procedure A at 4° C.

Figure 5:
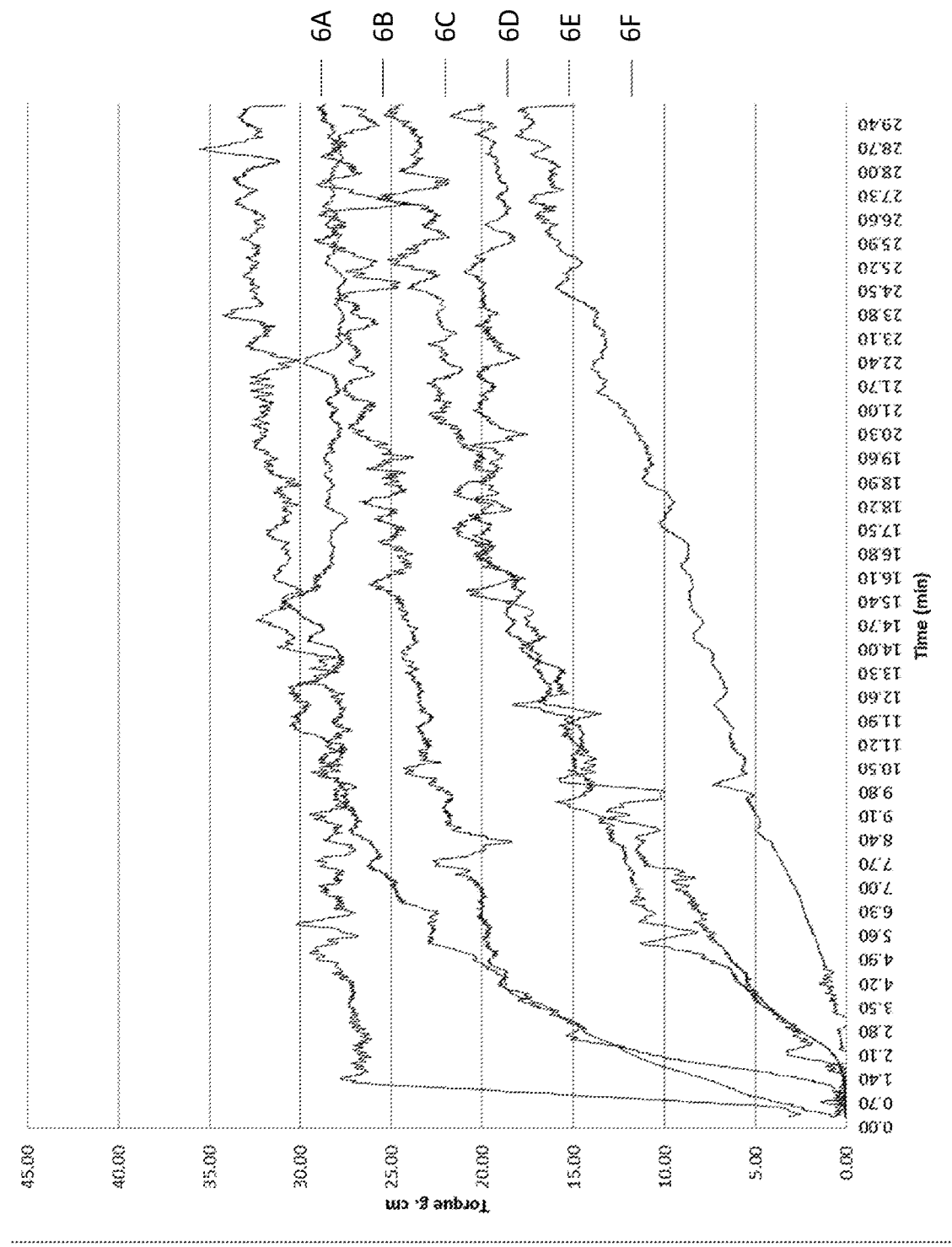
FIG. 5 shows a line graph of torque (g·cm) at 4° C. as a function of time, showing the inversion behavior of w/o lattices of the invention when inverted according to Procedure A.

The resulting torque measurements are shown in FIG. 5.

Example 8

Lattices 1A and 3A were formed according to the procedures of Examples 1 and 3, respectively. Instead of adding an inversion agent, 10 wt % of an inert hydrocarbon oil was added to the 1A and 3A lattices to form 1A Control and 3A Control lattices, which have the same polymer solids as the lattices tested in the Examples above wherein 10 wt % of e.g. methyl ricinoleate was added to the lattices. Then the Control lattices were inverted using Procedure B and the results compared to inversion using Procedure B as outlined for lattices 1A and 3A. Within the error of the measurements, the 1A and 1A Control lattices exhibited the same inversion behavior, as manifested by the rate at which the lattices increased in viscosity. Within the error of the measurements, the 3A and 3A Control lattices also exhibited the same inversion behavior, as manifested by the rate at which the lattices increased in viscosity. That is, the diluted lattices do not undergo any observable change in inversion behavior that is attributable to the dilution itself.

Example 9

Differential scanning calorimetry (DSC) measurements were performed using a TA Instruments Q200 Differential Scanning Calorimeter under $N_2$-controlled atmosphere. Between 3 mg and 8 mg of a latex was placed inside an aluminum DSC sample pan. The pan was sealed with an aluminum sample lid. The sample was equilibrated at −50° C. and then heated at 10° C./min to 30° C. (first heating). The sample was then cooled to −50° C. quickly and heated at 10° C./min to 30° C. again (second heating). The second heating curves were used to determine the transition temperatures.

A w/o latex was prepared having 26.8 wt % of a copolymer of 70 mol % acrylamide and 30 mol % acrylic acid; water; an oil; and a nonionic latex surfactant combination using a similar procedure as described in U.S. Pat. No. 9,822,297 was mixed with methyl ricinoleate, followed by DSC analysis. Table 5 lists the thermal transition peaks observed for each methyl ricinoleate concentration. The low temperature transitions were found to correlate approximately to the observed pour points of the samples, that is, the temperature below which the lattices themselves (prior to drying) are not observed to flow when the bottle containing the latex is tipped on its side (about 90°).

TABLE 5

Thermal transition peaks observed for lattices after adding the indicated concentration of methyl ricinoleate to the latex. Concentration is in weight percent based on total latex weight.

| % Methyl ricinoleate | Observed Transition (° C.) |
| --- | --- |
| 0 | −7.9, −1.1 |
| 1 | −8.6 |
| 3 | −47.7, −39.6, 14.3 |
| 5 | −40.8, −14.6 |
| 7 | −41.1, −9.7, −2.2 |

Examples 10 and 11

A w/o latex was prepared having 42.86 wt % of a copolymer of 50 mol % acrylamide and 50 mol % 2-(acryloyloxy)-N,N,N-trimethylethanammonium chloride; water; an oil; and a nonionic latex surfactant combination using a similar procedure as described in U.S. Pat. No. 5,137,641 was evaluated for the benefits of the reduced bulk viscosity of the latex upon addition of methyl ricinoleate. The latex 10 was mixed with 10 wt % methyl ricinoleate based on total latex weight using a cage stirrer at 400 rpm to make latex 10A; and then 2 wt % of a C-10 to C-16 ethoxylated alcohol was added to latex 10A to make latex 10B. The bulk viscosity of lattices 10, 10A, and 10B was measured using a Brookfield viscometer with spindle #62 at 30 rpm, 23° C. Table 6 shows the viscosity measured for lattices 10, 10A, 10B.

The experiment was repeated using a different lot of the same polymer latex, to obtain lattices 11, 11A, and 11B. Table 6 shows the viscosity measured for lattices 11, 11A, 11B, showing a reduction in viscosity upon addition of methyl ricinoleate, further wherein the reduction is reproducible even when different lots of latex polymer product are used as starting materials.

TABLE 6

Brookfield viscosity for cationic lattices with and without 10 wt % methyl ricinoleate based on the total latex weight.

| Ex. | % MR | Measured viscosity (cPs) |
| --- | --- | --- |
| 10 | 0 | 1028 |
| 11 | 0 | 976 |
| 10A | 10 | 191 |
| 11A | 10 | 186 |
| 10B | 10 | 146 |
| 11B | 10 | 142 |

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

The invention claimed is:

1. An invertible latex comprising
a water-in-oil latex comprising 15 wt % to 70 wt % of a water soluble polymer comprising about 1 mol % to 100 mol % acrylamide residues;
0.1 wt % to 10 wt % of an inversion surfactant characterized as having a hydrophilic/lipophilic balance of 10 or greater; and
0.1 wt % to 20 wt % of an alkyl ricinoleate.

2. The latex of claim 1 comprising about 1 wt % to 20 wt % of the combination of alkyl ricinoleate and inversion surfactant.

3. The invertible latex of claim 1 wherein the alkyl ricinoleate is a C1-C6 alkyl ricinoleate.

4. The invertible latex of claim 1 comprising about 1 wt % to 10 wt % of the alkyl ricinoleate.

5. The invertible latex of claim 1 wherein the water soluble polymer further comprises one or more residues of acrylic acid and/or a conjugate base thereof.

6. The invertible latex of claim 1, wherein the water soluble polymer further comprises one or more residues of N,N-diallyl-N,N-dimethylammonium chloride, 2-(acryloyloxy)-N,N,N-trimethylethanammonium chloride, alkyl acrylates, methacrylic acid, 2-acrylamido-2-methylpropane sulfonic acid, or two or more thereof.

7. The invertible latex of claim 1 wherein the weight-average molecular weight of the water soluble polymer is about $3\times10^5$ to $1\times10^8$ g/mol.

8. The invertible latex of claim 1 wherein the inversion surfactant comprises one or more alcohol ethoxylates.

9. The invertible latex of claim 1 wherein the latex has a bulk viscosity 30% to 95% lower than the same latex excluding the inversion agent.

10. A method of forming an invertible latex, the method comprising
(a) forming a water-in-oil latex comprising
about 15 wt % to 70 wt % of a water soluble polymer;
about 3 wt % to 50 wt % water,
about 10 wt % to 40 wt % of a compound or blend thereof that is less than 0.1 wt % soluble in water at 25° C. and is substantially a liquid over the range of 20° C. to 90° C. and comprising linear, branched, or cyclic hydrocarbon moieties; and
about 20 wt % or less of a latex surfactant; and
(b) adding an inversion surfactant and an alkyl ricinoleate to the latex to form an invertible latex.

11. The method of claim 10 comprising adding about 0.1 wt % to 20 wt % alkyl ricinoleate and about 0.1 wt % to 10 wt % of the inversion surfactant to form the invertible latex.

12. The method of claim 10 further comprising storing the invertible latex for a period of about 1 day to 5 years within a temperature range of −10° C. to 60° C.

13. A method of forming a polymer solution, the method comprising mixing a water source with an invertible latex of claim 1, wherein the polymer solution comprises about 100 ppm to 10,000 ppm of the water soluble polymer.

14. The method of claim 13 wherein the mixing comprises adding the invertible latex to the water source in a single addition.

15. A method of recovering the hydrocarbon compounds from a subterranean reservoir, the method comprising forming a polymer solution according to claim 13, injecting the polymer solution into the subterranean reservoir, and recovering the hydrocarbon compounds.

16. The method of claim 15, wherein the water source is about −10° C. to 100° C.

17. The method of claim 15 wherein the water source includes about 0.1 to 30 wt % total dissolved solids.

* * * * *